US012715671B2

(12) United States Patent
Baldoy Ruiz et al.

(10) Patent No.: US 12,715,671 B2
(45) Date of Patent: Aug. 25, 2026

(54) INTEGRATED LIQUID CONTAINER SYSTEM AND METHOD OF ASSEMBLY THEREOF

(71) Applicant: Cargill, Incorporated, Wayzata, MN (US)

(72) Inventors: Alberto Baldoy Ruiz, Burguillos (ES); Christopher Garzon, York, PA (US); John Matthew Kempainen, Troy, OH (US); Ramon Luis, Brussels (BE); Alex Miller, Wayzata, MN (US); Joseph Schomisch, Burlington, WI (US)

(73) Assignee: Cargill, Incorporated, Wayzata, MN (US)

( * ) Notice: Subject to any disclaimer, the term of this patent is extended or adjusted under 35 U.S.C. 154(b) by 20 days.

(21) Appl. No.: 18/411,401

(22) Filed: Jan. 12, 2024

(65) Prior Publication Data

US 2024/0239583 A1 Jul. 18, 2024

Related U.S. Application Data

(60) Provisional application No. 63/479,637, filed on Jan. 12, 2023.

(51) Int. Cl.
*B65D 77/04* (2006.01)
*B65D 1/02* (2006.01)
(Continued)

(52) U.S. Cl.
CPC ....... *B65D 77/0426* (2013.01); *B65D 1/0207* (2013.01); *B65D 1/0246* (2013.01);
(Continued)

(58) Field of Classification Search
CPC .............. B65D 77/0426; B65D 1/0207; B65D 1/0246; B65D 5/4204; B65D 5/46072; B65D 5/563; B65D 23/108; B65D 77/065
(Continued)

(56) References Cited

U.S. PATENT DOCUMENTS 3,119,544 A * 1/1964 Cope ...................... B65D 5/701
229/117.16
3,160,326 A * 12/1964 Sturdevant ........... B65D 5/5045
222/466
(Continued)

FOREIGN PATENT DOCUMENTS

BE 625230 A 3/1963
EM 015013858-0001 3/2023
(Continued)

OTHER PUBLICATIONS

U.S. Appl. No. 29/866,372, filed Sep. 9, 2022, Cargill, Incorporated.
(Continued)

*Primary Examiner* — Ernesto A Grano

(57) ABSTRACT

An integrated liquid container system includes a housing and a liquid delivery container. The housing includes a housing top portion having a neck aperture, a housing bottom portion opposite the housing top portion, and a housing body portion extending between the housing top portion and the housing bottom portion and defining a housing inner cavity. The housing body portion includes a first surface and at least one aperture extending through the first surface of the housing body portion. The liquid delivery container includes a container top portion having a neck, a container bottom portion opposite the container top portion, and a container body portion extending between the container top portion and the container bottom portion to define a container inner cavity that stores liquid. The liquid deliv-
(Continued)

ery container being able to be received within the container inner cavity such that the neck aperture circumferentially extends around the neck.

25 Claims, 27 Drawing Sheets

(51) Int. Cl.
*B65D 5/42* (2006.01)
*B65D 5/46* (2006.01)
*B65D 5/56* (2006.01)
*B65D 23/10* (2006.01)
*B65D 41/04* (2006.01)
*B29C 49/06* (2006.01)
*B29L 31/00* (2006.01)

(52) U.S. Cl.
CPC ....... *B65D 5/4204* (2013.01); *B65D 5/46072* (2013.01); *B65D 5/563* (2013.01); *B65D 23/108* (2013.01); *B65D 41/04* (2013.01); *B29C 49/06* (2013.01); *B29K 2995/0097* (2013.01); *B29L 2031/7158* (2013.01); *B32B 2439/62* (2013.01); *B65D 2203/04* (2013.01); *B65D 2501/0081* (2013.01)

(58) Field of Classification Search
USPC ........................................................ 220/23.87
See application file for complete search history.

(56) References Cited

U.S. PATENT DOCUMENTS 3,349,986 A * 10/1967 Chapman ................. B65D 5/76 229/5.5
4,524,883 A * 6/1985 Herring ................ B65D 77/065 206/509
D305,101 S 12/1989 Winterling
4,927,042 A * 5/1990 Ring .................. B65D 21/0237 222/465.1
5,462,169 A * 10/1995 Dygert ................. B65D 81/107 229/242
5,497,899 A * 3/1996 Wuerfel ............... B65D 77/065 215/398
D379,759 S 6/1997 Mulry
5,765,711 A * 6/1998 Johnson ............. B65D 77/0426 220/62.2
6,045,036 A * 4/2000 Ring .................. B65D 77/0426 220/23.86
D454,789 S * 3/2002 Harvey .......................... D9/527
6,994,233 B2 2/2006 Kuhar et al.
7,000,794 B2 * 2/2006 Soehnlen ................. B65D 1/20 220/675
7,090,115 B2 * 8/2006 Pierce .................... B65D 5/029 229/109
7,364,045 B2 4/2008 Dygert et al.
7,531,125 B2 5/2009 Dygert et al.
D612,247 S 3/2010 Lembke et al.
7,681,783 B2 * 3/2010 Stephenson ............ B65D 77/22 220/495.01
7,699,171 B2 4/2010 Rivera et al.
7,726,503 B2 6/2010 Price et al.
D619,468 S 7/2010 Lembke et al.
D623,955 S 9/2010 Lembke et al.
D624,420 S 9/2010 Krzysik et al.
8,065,857 B2 11/2011 Rivera et al.
D652,727 S 1/2012 Zancan
D652,728 S 1/2012 Zancan
D653,114 S 1/2012 Riggs et al.
D657,665 S 4/2012 Riggs et al.
D657,681 S 4/2012 Krzysik et al.
D668,951 S 10/2012 Voelker
8,365,939 B2 2/2013 Price et al.
8,511,538 B2 * 8/2013 Ouillette .................. B67D 3/00 229/117.11
8,544,649 B2 10/2013 Longbottom et al.
D703,529 S 4/2014 Voelker
D725,465 S 3/2015 Voelker
D749,422 S 2/2016 Janeczek
9,248,932 B2 2/2016 Futral et al.
D751,916 S 3/2016 Dygert et al.
D779,952 S 2/2017 Dygert et al.
D779,953 S 2/2017 Dygert et al.
D779,954 S 2/2017 Dygert et al.
D779,956 S 2/2017 Dygert et al.
9,567,128 B2 2/2017 Dygert et al.
D780,587 S 3/2017 Dygert et al.
9,637,302 B2 * 5/2017 Kuhar ................ B65D 25/2894
D788,592 S 6/2017 Shaver et al.
D792,781 S 7/2017 Shaver
D800,567 S 10/2017 Janeczek et al.
D807,187 S 1/2018 Shaver
9,981,768 B1 5/2018 Janeczek et al.
9,994,361 B2 6/2018 Dygert et al.
D823,690 S 7/2018 Janeczek et al.
D823,691 S 7/2018 Janeczek et al.
D832,098 S 10/2018 Ogg et al.
10,093,444 B2 10/2018 Ring et al.
D833,282 S * 11/2018 Thompson ..................... D9/432
D833,286 S 11/2018 Ogg et al.
D837,062 S 1/2019 Senior
10,189,623 B2 * 1/2019 Voelker ................ B65D 5/4608
10,195,781 B2 2/2019 Dygert et al.
D843,836 S 3/2019 Palmer
D845,134 S 4/2019 Palmer
10,259,609 B2 4/2019 Kuhar et al.
10,273,051 B2 4/2019 Ring et al.
D849,551 S 5/2019 Kelley et al.
D850,275 S 6/2019 Kelley et al.
10,384,824 B2 8/2019 Palmer et al.
D868,583 S 12/2019 Palmer
D868,584 S 12/2019 Palmer
D874,284 S 2/2020 Palmer et al.
D874,288 S 2/2020 Manderfield et al.
D874,940 S 2/2020 Janeczek et al.
10,549,879 B2 2/2020 Palmer et al.
10,569,923 B2 2/2020 Dygert et al.
D880,301 S 4/2020 Janeczek et al.
D880,302 S 4/2020 Palmer et al.
D880,307 S 4/2020 Kelley et al.
D882,403 S 4/2020 Palmer
D886,621 S 6/2020 Palmer et al.
D886,622 S 6/2020 Palmer et al.
D887,274 S 6/2020 Palmer
D891,930 S 8/2020 Palmer et al.
D892,625 S 8/2020 Palmer et al.
10,737,822 B2 8/2020 Dygert et al.
10,737,823 B2 8/2020 Palmer et al.
D895,425 S 9/2020 Janeczek et al.
10,836,530 B2 11/2020 Palmer
D904,195 S 12/2020 Kuhar et al.
D905,562 S 12/2020 Futral et al.
10,889,048 B2 1/2021 Dygert et al.
D915,888 S 4/2021 Wade
D915,889 S 4/2021 Wade
11,001,431 B2 5/2021 Dygert et al.
D920,799 S 6/2021 Manderfield et al.
D921,489 S 6/2021 Futral et al.
11,027,884 B2 6/2021 Manderfield et al.
D924,687 S 7/2021 Marcrum et al.
D924,688 S 7/2021 Marcrum et al.
D926,570 S 8/2021 Engelbrecht
D927,982 S 8/2021 Manderfield et al.
D928,623 S 8/2021 Kelley et al.
11,117,721 B1 9/2021 Manderfield et al.
D932,311 S 10/2021 Manderfield et al.
D932,898 S 10/2021 Dygert et al.
11,174,061 B2 11/2021 Dygert et al.
D939,352 S 12/2021 Kelley et al.
D942,866 S 2/2022 Palmer et al.
D947,032 S 3/2022 Manderfield et al.
D955,885 S 6/2022 Kelley et al.

(56) References Cited

U.S. PATENT DOCUMENTS

| | | | | |
|---|---|---|---|---|
| 11,396,396 | B2 | 7/2022 | Palmer | |
| D961,389 | S | 8/2022 | Smarrelli | |
| 11,459,147 | B2 | 10/2022 | Futral et al. | |
| 12,030,698 | B2 * | 7/2024 | Manderfield, Jr. | B65D 25/2894 |
| 2003/0160092 | A1 * | 8/2003 | Philips | B65D 77/065 229/122.32 |
| 2006/0180643 | A1 | 8/2006 | Stephenson | |
| 2007/0023384 | A1 * | 2/2007 | Janeczek | B65D 25/2882 215/373 |
| 2008/0073317 | A1 * | 3/2008 | Dygert | B65D 77/0426 215/397 |
| 2012/0312813 | A1 * | 12/2012 | Voelker | B65D 77/0426 220/639 |
| 2013/0068764 | A1 | 3/2013 | Kuhar et al. | |
| 2013/0112739 | A1 * | 5/2013 | Philips | B65D 5/566 222/105 |
| 2014/0374447 | A1 * | 12/2014 | Coogan | B65D 5/746 53/449 |
| 2016/0207242 | A1 * | 7/2016 | Ferrari | C08J 5/00 |
| 2018/0201405 | A1 * | 7/2018 | Saito | B65D 77/22 |
| 2018/0370676 | A1 * | 12/2018 | Thompson | B65D 5/0227 |
| 2019/0152671 | A1 * | 5/2019 | Voelker | B65D 5/4204 |
| 2021/0129409 | A1 | 5/2021 | Kelley et al. | |
| 2021/0214116 | A1 | 7/2021 | Palmer et al. | |
| 2021/0229888 | A1 | 7/2021 | Dygert et al. | |
| 2021/0261298 | A1 | 8/2021 | Manderfield et al. | |
| 2021/0403208 | A1 | 12/2021 | Manderfield et al. | |
| 2022/0048664 | A1 | 2/2022 | Dygert et al. | |
| 2024/0239583 | A1 | 7/2024 | Baldoy Ruiz | |

FOREIGN PATENT DOCUMENTS

| | | |
|---|---|---|
| EM | 015013858-0002 | 3/2023 |
| EM | 015014799-0005 | 3/2023 |
| EM | 015014799-0006 | 3/2023 |
| EM | 015014799-0007 | 3/2023 |
| EM | 015014799-0008 | 3/2023 |
| EM | 015013859-0001 | 4/2023 |
| EM | 015013859-0002 | 4/2023 |
| ES | 2910084 A1 | 5/2022 |
| GB | 2627089 | 3/2023 |
| GB | 6266892 | 3/2023 |
| GB | 6266893 | 3/2023 |
| GB | 6266897 | 3/2023 |
| GB | 6266898 | 3/2023 |
| GB | 6267090 | 3/2023 |
| GB | 6267091 | 3/2023 |
| GB | 6267092 | 3/2023 |
| GB | 6279385 | 5/2023 |
| GB | 6279386 | 5/2023 |
| GB | 6279387 | 5/2023 |
| GB | 6279388 | 5/2023 |
| MX | 54466 | 5/2017 |
| WO | WO 2024054969 A2 | 3/2024 |

OTHER PUBLICATIONS

U.S. Appl. No. 29/866,374, filed Sep. 9, 2022, Cargill, Incorporated.
U.S. Appl. No. 29/866,375, filed Sep. 9, 2022, Cargill, Incorporated.
U.S. Appl. No. 29/866,376, filed Sep. 9, 2022, Cargill, Incorporated.
U.S. Appl. No. 29/866,380, filed Sep. 9, 2022, Cargill, Incorporated.
U.S. Appl. No. 29/866,382, filed Sep. 9, 2022, Cargill, Incorporated.
U.S. Appl. No. 29/866,384, filed Sep. 9, 2022, Cargill, Incorporated.
U.S. Appl. No. 29/866,385, filed Sep. 9, 2022, Cargill, Incorporated.
U.S. Appl. No. 29/869,930, filed Jan. 30, 2023, Cargill, Incorporated.
"665—Screw neck 63 mm" Web page from DauniaPlast, available as early as Nov. 29, 2023 [online]. Retrieved from the Internet: <URL: https://www.dauniaplast.it/en/product/665-screw-neck-63-mm>; 6 pages, [retrieved on Sep. 6, 2024].
"Bag-In-Box for Edible Oil" Web page from Optopack, available as early as Nov. 5, 2016 [online]. Retrieved from the Internet: <URL: https://optopack.eu/bag-in-box-packaging/food/edible-oil/>; 5 pages, [retrieved on Sep. 6, 2024].
Drinks carton recycling breaks 50% barrier, posted Nov. 9, 2020 [retrieved Mar. 18, 2024]. Retrieved from internet, https://www.mrw.co.uk/news/drink-carton-recycling-breaks-50-barrier-Sep. 11, 2020/ (Year: 2020).
PCT Application No. PCT/US2023/073720, filed Sep. 8, 2023; International Search Report / Written Opinion issued Mar. 7, 2024; 13 pages.
PET bottles and plastic bottles manufacturer, dauniaplast—PET Preform and Bottles production, https://www.dauniaplast.it/en/bottles/#c25lt (retrieved Aug. 22, 2022) (3 pages).
"The PET-in-Box Concept" Web page from PETPlanet, Apr. 24, 2019 [online]. Retrieved from the Internet: <URL: https://petpla.net/2019/04/24/the-pet-in-box-concept/>; 4 pages, [retrieved on Jun. 17, 2024].
"Staying Ahead of the Curve: How a Blow Molder Thrives as a 'Technology Company'" Web page from Plastics Technology, Feb. 1, 2022 [online]. Retrieved from the Internet: <URL: https://www.ptonline.com/articles/staying-ahead-of-the-curve-how-a-blow-molder-thrives-as-a-technology-company>; 11 pages, [retrieved on Aug. 4, 2024].

* cited by examiner

INTEGRATED LIQUID CONTAINER SYSTEM AND METHOD OF ASSEMBLY THEREOF

This application claims the benefit of U.S. Provisional Application No. 63/479,637, filed 12 Jan. 2023, the disclosure of which is incorporated by reference herein in its entirety.

TECHNICAL FIELD

The present disclosure relates generally to an integrated liquid container system and a method of assembling the same. The integrated liquid container system is configured to allow storing and transporting liquids, such as edible oil, including fresh cooking oil.

BACKGROUND

Integrated liquid container systems, which include a housing and a liquid delivery container, are used to store and transport edible oil. These integrated liquid container systems are typically disposable plastic jugs-in-boxes ("JIBs").

SUMMARY

Various features of the disclosure are described below with regard to certain examples and aspects, which are intended to illustrate but not limit the disclosure. Although the examples and aspects described herein may focus on, for the purpose of illustration, specific systems and processes, one of skill in the art may appreciate the examples are illustrative only, and are not intended to be limiting.

In accordance with some aspects of the present disclosure, an integrated liquid container system is disclosed. The integrated liquid container system includes a housing and a liquid delivery container. The housing includes a housing top portion having a neck aperture, a housing bottom portion opposite the housing top portion, and a housing body portion extending between the housing top portion and the housing bottom portion and defining a housing inner cavity. The housing body portion includes a first surface and at least one aperture extending through the first surface of the housing body portion. The liquid delivery container includes a container top portion having a neck, a container bottom portion opposite the container top portion, and a container body portion extending between the container top portion and the container bottom portion to define a container inner cavity that stores liquid. The liquid delivery container being able to be received within the container inner cavity such that the neck aperture of the housing top portion circumferentially extends around the neck of the container top portion. The container top portion, the container bottom portion, and the container body portion each include a thermoplastic polymer.

In an example aspect, the housing top portion, the housing bottom portion, and the housing body portion include corrugated cardboard.

In another example aspect, the neck includes a neck top portion having a support ring and a threaded portion and a neck bottom portion having a straight portion below the support ring. The integrated liquid container system further includes a cap that is selectively attachable to and detachable from the neck top portion. When the cap is attached to the neck top portion by engagement with the threaded portion, the liquid delivery container is in a closed state, and when the cap is detached from the neck top portion, the liquid delivery container is in an open state. The integrated liquid container system further include a container handle proximate to the neck bottom portion.

In another example aspect, the housing bottom portion includes a pouring aperture and the container bottom portion includes a pouring indent. The pouring indent at least partially faces the pouring aperture.

In another example aspect, housing top portion further includes a first handle aperture.

In another example aspect, the housing body portion includes a second surface and a second handle aperture extending through the second surface of the housing body portion.

In another example aspect, the housing further includes a housing handle. The housing handle is coupled to the housing top portion.

In another example aspect, the housing handle includes paperboard or corrugated cardboard.

In another example aspect, the neck is disposed either (i) along a center axis of the liquid delivery container, or (ii) off-axis of the center axis of the liquid delivery container.

In another example aspect, the neck includes a first surface having a substantially constant circumference such that an outermost portion of the first surface of the neck is equidistant from a center axis of the neck. The first surface of the neck is structured without protuberances extending circumferentially therefrom.

In another example aspect, the container top portion includes a first portion parallel to the housing top portion. The container top portion further includes a second portion inclined with respect to the first portion of the container top portion. The neck is disposed along the second portion of the container top portion.

In another example aspect, the at least one aperture is provided proximate to a plurality of indicia indicating a fill level.

In another example aspect, the thermoplastic polymer has an intrinsic viscosity of about 0.70 dl/g to about 0.90 dl/g.

In another example aspect, the thermoplastic polymer has an intrinsic viscosity of about 0.72 dl/g to about 0.86 dl/g.

In another example aspect, the thermoplastic polymer has a melting temperature in a range of about 230° ° C. to about 270° ° C.

In another example aspect, the thermoplastic polymer further includes a b* value of a CIEL*a*b* color measurement of the thermoplastic polymer of about −3.5 to about 2.5.

In another example aspect, the b* value of the CIEL*a*b* color measurement of the thermoplastic polymer is in a range of about −1.5 to about 1.5.

In another example aspect, the thermoplastic polymer includes bioplastics, co-polymers, or combinations thereof.

In another example aspect, the thermoplastic polymer includes polyethylene terephthalate (PET), poly lactic acid (PLA), polyethylene (PE), polypropylene (PP), polyhydroxyalkanoates (PHA), or mixtures thereof.

In another example aspect, the thermoplastic polymer is selected from the group of polyethylene terephthalate (PET), poly lactic acid (PLA), polyethylene (PE), polypropylene (PP), polyhydroxyalkanoates (PHA), and combinations thereof.

In another aspect, the thermoplastic polymer includes polyethylene terephthalate (PET).

In accordance with some aspects of the present disclosure, a method of assembling an integrated liquid container system including a liquid delivery container within a housing is disclosed. The method includes assembling a corrugated cardboard template into the housing. The housing being dimensioned to house the liquid delivery container The housing includes a housing top portion having a neck aperture, a housing bottom portion opposite the housing top portion, and a housing body portion extending between the housing top portion and the housing bottom portion to define a housing inner cavity. The housing body portion includes a first surface and at least one aperture extending through the first surface of the housing body portion. The method further includes arranging the liquid delivery container within the housing inner cavity. The liquid delivery container includes a container top portion having a neck, a container bottom portion opposite the container top portion and having a pouring indent, and a container body portion extending between the container top portion and the container bottom portion to define a container inner cavity. The liquid delivery container top portion, the liquid delivery container bottom portion, and the liquid delivery container body portion have a thermoplastic polymer. Arranging the liquid delivery container within the housing inner cavity includes orienting the liquid delivery container such that the neck aperture of the housing top portion circumferentially surrounds at least a portion of the neck of the container top portion. The method further includes securing the liquid delivery container in the housing.

In an example aspect, the method includes assembling a plurality of integrated liquid container systems together. The plurality of integrated liquid container systems include a first integrated liquid container system and a second integrated liquid container system. Assembling the plurality of integrated liquid container systems includes arranging the first integrated liquid container system such that the pouring indent of the first integrated liquid container system receives at least a portion of the neck of the second integrated liquid container system.

In another example aspect, the thermoplastic polymer has an intrinsic viscosity of about 0.70 dl/g to about 0.90 dl/g.

In another example aspect, the thermoplastic polymer has a melting temperature in a range of about 230° ° C. to about 270° C.

In another example aspect, the thermoplastic polymer further includes a b* value of a CIEL*a*b* color measurement of the thermoplastic polymer of about −3.5 to about 2.5.

In another example aspect, the thermoplastic polymer includes bioplastics, co-polymers, or combinations thereof.

In another example aspect, the thermoplastic polymer includes polyethylene terephthalate (PET), poly lactic acid (PLA), polyethylene (PE), polypropylene (PP), polyhydroxy alkanoates (PHA), or mixtures thereof.

In another example aspect, the thermoplastic polymer includes polyethylene terephthalate (PET).

In another example aspect, securing the liquid container in the housing comprises inverting at least one tab disposed between the housing top portion and the housing body portion such that the tab contacts at least a portion of the container top portion.

In accordance with some aspects of the present disclosure, a method of assembling an integrated liquid container system is disclosed. The method includes providing an outer portion of the integrated liquid container system. The outer portion includes a box template. The method further includes providing an inner portion of the integrated liquid container system. The inner portion having a bottle. The bottle includes a bottle top portion having a neck, a bottle bottom portion opposite the bottle top portion, and a bottle body portion extending between the bottle top portion and the bottle bottom portion to define a bottle inner cavity. The bottle top portion, the bottle bottom portion, and the bottle body portion include a thermoplastic polymer. The thermoplastic polymer includes polyethylene terephthalate (PET), poly lactic acid (PLA), polyethylene (PE), polypropylene (PP), polyhydroxyalkanoates (PHA), or mixtures thereof. The method further includes wrapping the box template around the bottle and assembling the box template into a box. The box includes a box top portion having a neck aperture, a box bottom portion opposite the box top portion, and a box body portion extending between the box top portion and the box bottom portion to define a box inner cavity. The box body portion having a first surface and at least one aperture extending through the first surface of the box body portion. Each of the box top portion and the box bottom portion including a portion having double-walled corrugated cardboard.

In an example aspect, providing the outer portion of the integrated liquid container system includes providing a first liner sheet, a second liner sheet, and a corrugated sheet medium. The corrugated sheet medium having a first side and a second side. Providing the outer portion of the integrated liquid container system further includes coupling the first liner sheet to the first side of the corrugated sheet medium and the second liner sheet to the second side of the corrugated sheet medium, such that combination of the first liner sheet, the second liner sheet, and the corrugated sheet medium defines a board. Providing the outer portion of the integrated liquid container system further includes cutting and scoring the board and configuring the board into the box template.

In another example aspect, providing the inner portion of the integrated liquid container system includes injecting the thermoplastic polymer resin and molding a preform, heating the preform, and stretch blow molding the preform into the bottle.

In accordance with some aspects of the present disclosure, a bottle is disclosed. The bottle includes a bottle top portion having a neck. The neck includes a continuous inner surface portion equidistant from a center axis of the neck. The neck further includes a neck top portion and a neck bottom portion. The neck is positioned at an axial center of the liquid delivery container. The bottle further includes a bottle bottom portion opposite the bottle top portion. The bottle bottom portion having a pouring indent. The pouring indent is a substantially curvilinear recess formed in an underside of the bottle bottom portion. The bottle further includes a bottle body portion extending between the bottle top portion and the bottle bottom portion to define a bottle inner cavity. The bottle top portion, the bottle bottom portion, and the bottle body portion consists of a thermoplastic polymer selected from the group consisting of polyethylene terephthalate (PET), polylactic acid (PLA), polyethylene (PE), polypropylene (PP), polyhydroxyalkanoates (PHA), and combinations thereof. The bottle further includes a cap that is selectively attachable to and detachable from the neck top portion. When the cap is attached to the neck top portion, the bottle is in a closed state. When the cap is detached from the neck top portion, the bottle in an open state. The bottle further includes a plastic bottle handle having a first portion proximate the cap.

In an example aspect, the bottle handle extends from an uppermost surface of the bottle to a recess in a side surface of the bottle, such that at least a second portion of the bottle handle is configured to be stowed in the recess.

In another example aspect, the bottle top portion includes a wall thickness between approximately 0.2 mm and approximately 0.5 mm, the bottle body portion includes a wall thickness between approximately 0.15 mm and approximately 0.5 mm, and the bottle bottom portion includes a wall thickness between approximately 0.15 mm and approximately 0.5 mm.

In another example aspect, when the cap is attached to the neck top portion, the cap and the neck top portion create a plug-seal.

The foregoing summary is illustrative only and is not intended to be in any way limiting. In addition to the illustrative aspects, aspects, and features described above, further aspects, aspects, and features may become apparent by reference to the following drawings and the detailed description.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
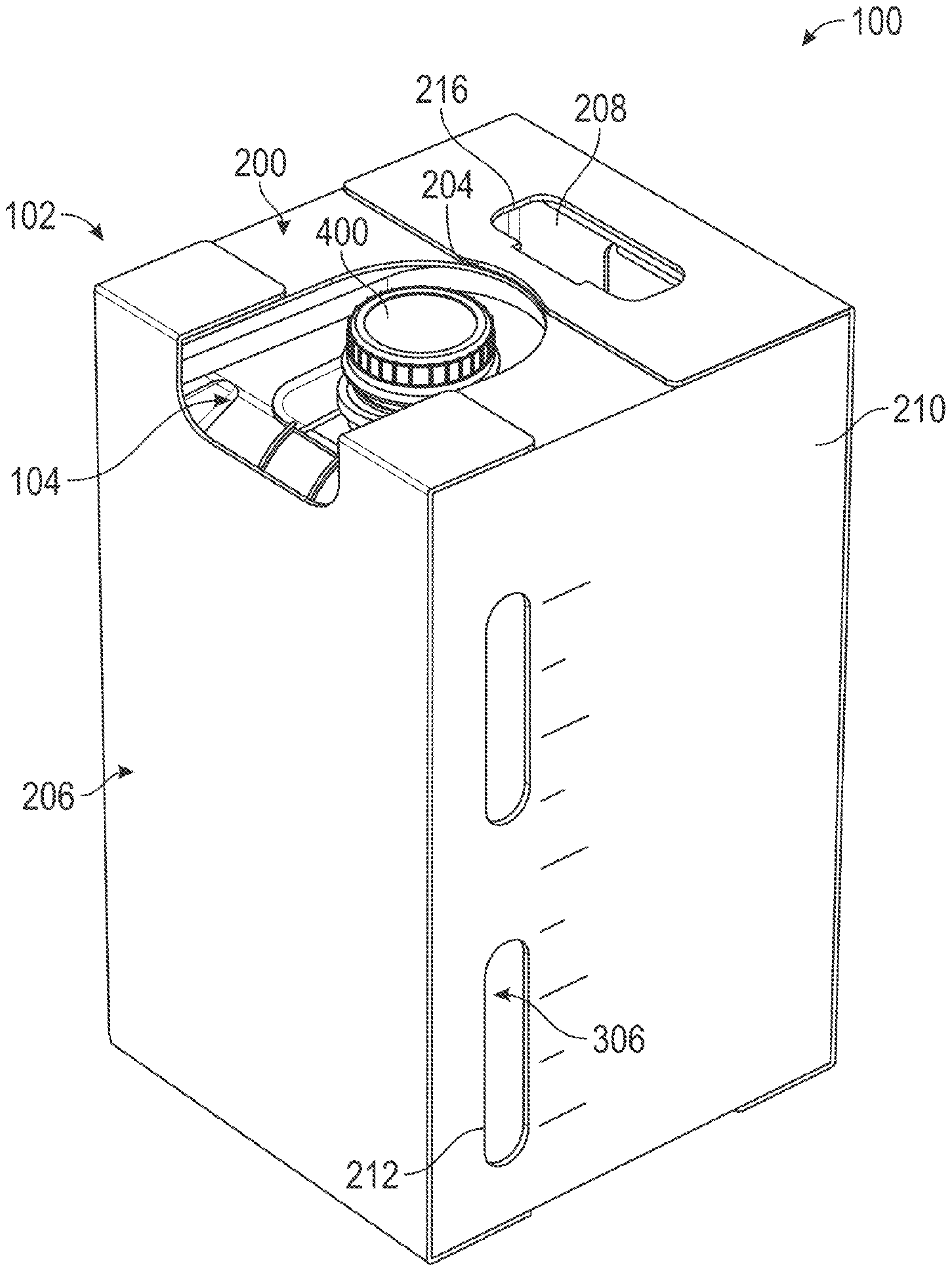
FIG. 1 is a front perspective view of an integrated liquid container, according to an aspect.
Figure 2:
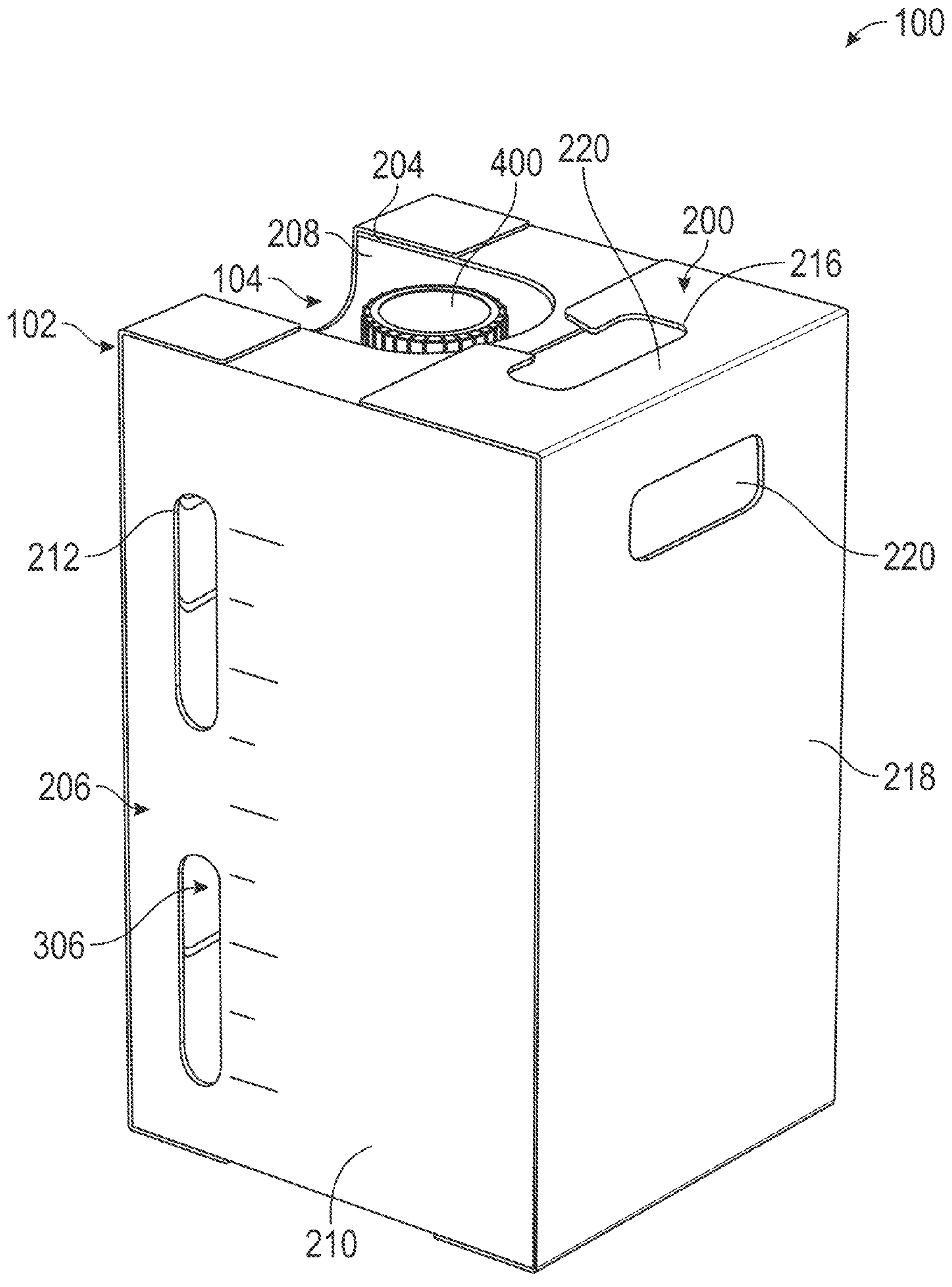
FIG. 2 is a rear perspective view of the integrated liquid container system of FIG. 1, according to an aspect.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing an integrated liquid container system. The various concepts introduced above and discussed in greater detail below may be implemented in any of a number of ways, as the described concepts are not limited to any particular manner of implementation. Examples of specific implementations and applications are provided primarily for illustrative purposes.

Various aspects of exemplary integrated liquid container systems and methods of assembly thereof are described in U.S. Provisional Application No. 63/375,120, filed Sep. 9, 2022, which is incorporated herein in its entirety by reference for the integrated liquid container systems, construction aspects thereof, and methods of manufacturing and assembling of integrated liquid container systems set forth therein.

I. OVERVIEW

Integrated liquid container systems, which include a housing and a liquid delivery container, are used to store and transport liquids, such as edible oil.

As used herein, the term "edible oil" refers to a fat or oil that is suitable for human consumption. Edible oils are typically compositions including triacylglycerols ("TAG"). The edible oils may be obtained from plant (e.g., vegetable), animal, or microbial sources. By way of illustration, the edible oils, as described herein, include cooking oils (such as fresh and/or used cooking oils). The oil may include, but is not limited to, sunflower oil, citrus oil (such as lemon oil, orange oil, and the like or mixtures thereof), grape seed oil, sesame oil, peanut oil, mustard oil, nut oil (such as almond oil, cashew oil, walnut oil, hazelnut oil, macadamia oil, or mixtures thereof), corn oil, wheat kernel oil, rapeseed oil, safflower oil, flaxseed oil, soy bean oil, canola oil, cottonseed oil, marine oil (such as fish oil, algal oil, fungal oil, or mixtures thereof), rice bran oil, olive oil, or mixtures of two or more thereof. The edible oil may be a high oleic edible oil, such as high oleic sunflower oil, high oleic citrus oil, high oleic grape seed oil, high oleic sesame oil, high oleic peanut oil, high oleic mustard oil, high oleic nut oil, high oleic corn oil, high oleic wheat kernel oil, high oleic rapeseed oil, high oleic safflower oil, high oleic flaxseed oil, high oleic soybean oil, high oleic canola oil, high oleic cottonseed oil, high oleic marine oil, or mixtures of two or more thereof.

Edible oils as described herein can also be fats, including but not limited to, butter, lard, tallow, butter oil, cocoa butter, mango butter, shea butter, milk fat, coconut oil, palm oil, palm olein, palm kernel oil, shea oil, illipe oil, sal oil, kokum gurgi oil, mango kernel oil, hydrogenated vegetable oil (such as hydrogenated fractionated palm kernel oil, hydrogenated cottonseed oil, hydrogenated soy bean oil, hydrogenated sunflower oil, hydrogenated canola oil, hydrogenated rapeseed oil, and the like or mixtures thereof), hydrogenated fish oil, or mixtures of two or more thereof. As used herein, "vegetable oils" refers to oils derived from vegetables and/or oil seeds. The edible oils as described herein may also be a hydrogenated edible oil, a chemically or enzymatically interesterified edible oil, a fractionated edible oil, or mixtures thereof.

During storage and transportation, integrated liquid container systems are often stacked on top of each other vertically. Thus, the integrated liquid container system according to an aspect of the present disclosure is designed to have a suitably strong and durable structure.

A typical integrated liquid container system in the form of a JIB has a volumetric capacity of about 4.5 gallons. A liquid delivery container of a typical integrated liquid container system is made of High Density Polyethylene (HDPE) and a neck of the liquid delivery container includes a lip that attaches to a foil seal (e.g., heat seal) to seal the liquid delivery container.

Implementations herein are related to an integrated liquid container system having a housing and a liquid delivery container configured to be received within the housing. In some aspects, the housing is made of corrugated cardboard and the liquid delivery container is made of a thermoplastic material (e.g., thermoplastic polymer, etc.), preferably having an intrinsic viscosity of about 0.70 dl/g to about 0.90 dl/g and a melting temperature in a range of about 230° ° C. to about 270° C. Suitable thermoplastic polymers having an intrinsic viscosity of about 0.70-0.90 dl/g and melting temperature of about 230-270° C. may include, but are not limited to, polyethylene terephthalate (PET), polylactic acid (PLA), polyethylene (PE), polypropylene (PP), polyhydroxyalkanoates (PHA), and combinations thereof. Preferably, the thermoplastic polymer is PET. In some aspects, the liquid delivery container is made of 0% to 100% recycled plastic. For example, the liquid delivery container may be made of 15% to 95% of recycled plastic, 25% to 85% recycled plastic, or 45% to 75% recycled plastic. In some aspects, the liquid delivery container is made from virgin plastic (e.g., pure-form polymer, 0% recycled plastic, etc.). In other aspects, the liquid delivery container is made from a mixture of recycled plastic and virgin plastic. In yet other aspects, the liquid delivery container is made completely or nearly completely from recycled plastic (e.g., more than 90% recycled plastic, or 100% recycled plastic, etc.).

The material properties of PET with respect to forming molded materials allows for the liquid delivery container to be manufactured with tight tolerances, removing a need for a foil seal (e.g., heat seal, etc.) to be used on the liquid delivery container. With the tight tolerances associated with PET, the liquid delivery container can be designed to properly seal simply by attaching to a cap. Thus, a so-called "plug-seal" may be achieved which allows for the cap to re-seal the liquid delivery container, when the cap is detached from liquid delivery container and re-attached to the liquid delivery container. In addition to reducing costs of materials and manufacturing by removing the need for the foil seal, other features of traditional containers may be omitted or modified as well. For example, a lip within a neck of the liquid delivery container, which is required for the foil seal, may be omitted. Removing the lip allows for liquid to exit the liquid delivery container via the neck with laminar or transitional flow characteristics rather than turbulent flow characteristics. Laminar and/or transitional flow generally reduces a possibility of the liquid splashing when passing through the neck.

Additionally, thermoplastic polymers as described herein (e.g., PET, PLA, PE, PP, PHA, or combinations thereof) are strong and flexible, thereby reducing a risk of the liquid delivery container cracking or breaking. Furthermore, PET is generally cost-effective, sustainable, and lightweight. PET is 100% recyclable (e.g., fully recyclable, etc.), allowing for the liquid delivery container to meet guidelines set by the Association of Plastic Recyclers (APR) regarding recyclability of plastics. In contrast, the liquid delivery container of the typical container system in the form of a JIB, which is made of HDPE, does not meet the guidelines set by the APR regarding recyclability due to the container having a foil seal and, typically, a polypropylene cap. PET can be formed to be at least partially transparent. The transparent characteristic of the thermoplastic polymers as described herein (e.g., PET) allow for an amount of the liquid within the liquid delivery container to be visually ascertained.

II. OVERVIEW OF EXAMPLE INTEGRATED LIQUID CONTAINER SYSTEM

FIGS. 1-12 and 24-27 depict various aspects of an integrated liquid container system 100 including a housing 102 and a bottle, e.g., liquid delivery container 104. The liquid delivery container 104 is configured to be received within the housing 102.

The housing 102 includes a housing top portion 200 and a housing bottom portion 202 opposite the housing top portion 200. The housing top portion 200 includes a neck aperture 204. The housing 102 also includes a housing body portion 206 that extends between the housing top portion 200 and the housing bottom portion 202. The housing body portion 206 defines a housing inner cavity 208 configured to receive the liquid delivery container 104. The housing body portion 206 includes a first surface 210 and an at least one aperture 212 that extends through the first surface 210 of the housing body portion 206. In some aspects, the housing top portion 200, the housing bottom portion 202, and the housing body portion 206 are made of (e.g., manufactured from, out of, etc.) corrugated cardboard. In other aspects, the housing top portion 200 and/or the housing bottom portion 202 include at least one portion having double-walled corrugated cardboard. In some aspects, the double-walled corrugated cardboard includes two single-walled corrugated cardboards in contact with one another. In other aspects, the double-walled corrugated cardboard is a single piece of corrugated cardboard that is manufactured to include double walls.

The liquid delivery container 104 includes a container top portion 300 and a container bottom portion 302 opposite the container top portion 300 (aspects of which are shown in FIGS. 13-20). The container top portion 300 includes a neck 304. The liquid delivery container 104 also includes a container body portion 306 that extends between the container top portion 300 and the container bottom portion 302. The container body portion 306 defines a container inner cavity 308 configured to store contents (e.g., edible oil, etc.). When the liquid delivery container 104 is received within the housing 102, the neck aperture 204 of the housing top portion 200 circumferentially extends around the neck 304 of the container top portion 300. In some aspects, the container top portion 300, the container bottom portion 302, and the container body portion 306 are made of polyethylene terephthalate (PET). While specific reference to PET is made throughout the description of the figures, the liquid delivery container may include other thermoplastic polymers including but not limited to bioplastics, co-polymers (block or random), or combinations thereof exhibiting properties comparable to PET (e.g., intrinsic viscosity, melting temperature, and the like). For example, in any aspect described herein, the container top portion 300, the container bottom portion 302, and the container body portion 306 may be made of thermoplastic polymers, including but not limited to polyethylene terephthalate (PET), polylactic acid (PLA), polyethylene (PE), polypropylene (PP), polyhydroxyalkanoates (PHA), or combinations thereof. Preferably, the thermoplastic polymer is PET.

In any aspect, the thermoplastic polymer as described herein may have an intrinsic viscosity of about 0.70 dl/g to about 0.90 dl/g. As used herein, the term "intrinsic viscosity." refers to the measure of a polymer's ability to increase the viscosity of a solvent. For example, the intrinsic viscosity may be in a range selected from about 0.70 dl/g to about 0.90 dl/g, about 0.72 dl/g to about 0.86 dl/g, or about 0.74 dl/g to about 0.84 dl/g. In any aspect, the intrinsic viscosity may be about 0.70 dl/g, about 0.72 dl/g, about 0.74 dl/g, about 0.76 dl/g, about 0.78 dl/g, about 0.80 dl/g, about 0.82 dl/g, about 0.84 dl/g, about 0.86 dl/g, about 0.88 dl/g, about 0.90 dl/g, or any range including and/or in between any two of the preceding values.

In any aspect, the thermoplastic polymer may have a melting temperature of about 230° ° C. to about 270° C. Suitable melting temperatures may include about 230° C., about 235° C., about 240° ° C., about 245° C., about 250° ° C., about 255° C., about 260° C., about 270° C.), or any range including and/or in between any two of the preceding values. Preferably the thermoplastic polymer may have a melting temperature in a range of about 235° C. to about 270° C., or more preferably in a range of about 235° C. to about 255° C.

In any aspect, the thermoplastic polymer may further be transparent, or at least partially transparent. For example, the thermoplastic polymer may have a b* value of a CIEL*a*b* color measurement of the thermoplastic polymer in a range of about −3.5 to about 2.5. For example, the b* value of a CIEL*a*b* color measurement of the thermoplastic polymer may be about −3.5, about −3.0, about −2.5, about −2.0, about −1.5, about −1.0, about −0.5, about 0.0, about 0.5, about 1.0, about 1.5, about 2.0, about 2.5, or any range including and/or in between any two of the preceding values. In any aspect, the b* value of a CIEL*a*b* color measurement of the thermoplastic polymer may be in a range of about −3.5 to about 2.5, preferably about −3.0 to about 2.0, more preferably about −2.0 to about 2.0, and most preferably about −1.5 to about 1.5.

Manufacturing parts of the liquid delivery container 104 (e.g., the container top portion 300, the container bottom portion 302, and the container body portion 306) using PET allows relatively tight manufacturing tolerances to be obtained. In particular, the moldability of PET is such that a design of the liquid delivery container 104 may be approximately equivalent in dimensions to a manufactured product of the liquid delivery container 104 based on that design. With tight tolerances, strong sealing performance can be obtained. Thus, the need for an additional component for sealing may be omitted. In particular, in at least one aspect, a foil seal may be omitted as there is no need for the neck 304 of the container top portion 300 to couple to the foil seal (e.g., heat seal, etc.). Proper sealing of the container inner cavity 308 of the liquid delivery container 104 is achieved without such a component, according to at least one aspect. Further, proper sealing of the container inner cavity 308 allows for the liquid delivery container 104 to be stored in any orientation, vertically or horizontally, without any leaking of fluid. Additionally, proper sealing of the container inner cavity 308 may be maintained even after the initial opening of the liquid delivery container 104 proximate the neck 304 (e.g., a first time the liquid delivery container 104 is opened, etc.). Furthermore, PET, as compared to HDPE, is relatively strong and flexible, reducing a risk of the liquid delivery container 104 cracking or breaking. Furthermore, PET is cost-effective, sustainable, lightweight, and can be manufactured to be at least partially transparent (e.g., clear, etc.). In any aspect, the liquid delivery container does not include HDPE. In some aspects, the container inner cavity 308 is configured to be filled with the liquid when the liquid delivery container 104 is received within the housing inner cavity 208 and/or secured to the housing 102. In some examples, the liquid delivery container 104 may lack sufficient structural support to maintain its non-filled structure (e.g., a structure of the liquid delivery container 104 when the container inner cavity 308 is empty or partially filled with liquid) when the container inner cavity 308 is completely filled or mostly filled with liquid.

In some aspects, illustrated in FIGS. 1-10, the at least one aperture 212 is provided proximate to a plurality of indicia indicating a fill level (e.g., capacity level, etc.) of the liquid delivery container 104. The at least one aperture 212 provides access to an outside surface of the container body portion 306. Assuming the container body portion 306 is made of PET, and is therefore at least partially transparent, the fill level of the liquid delivery container 104 can be determined visually via the plurality of indicia and the least one aperture 212. This removes a need to weigh the liquid delivery container 104, or other similar methods (e.g., weighing the integrated liquid container system 100, removing all of the liquid within the container inner cavity 308, etc.), in order to determine the fill level of the liquid delivery container 104.

The neck 304 of the container top portion 300 further includes a neck top portion 310 and a neck bottom portion 312. The neck top portion 310 includes a support ring and a threaded portion in the form of a finished thread. The neck bottom portion 312 includes a relatively smooth straight portion that is disposed beneath the threaded portion. The integrated liquid container system 100 further includes a cap 400 that is selectively attachable to and detachable from the neck top portion 310 such that (i) when the cap 400 is attached to the neck top portion 310, the liquid delivery container 104 is in a closed state, and (ii) when the cap 400 is detached from the neck top portion 310, the liquid delivery container 104 is in an open state. More particularly, the cap 400 is configured to be threaded to the threaded portion.

With the tight tolerances available with using PET to manufacture the liquid delivery container 104, the liquid delivery container 104 can be designed to properly seal simply by attaching the cap 400 to the neck top portion 310. This type of seal is referred to as a plug-seal. The plug-seal allows for the cap 400 to re-seal the liquid delivery container

104, when the cap 400 is detached from liquid delivery container 104 and re-attached to the liquid delivery container 104.

Figure 8:
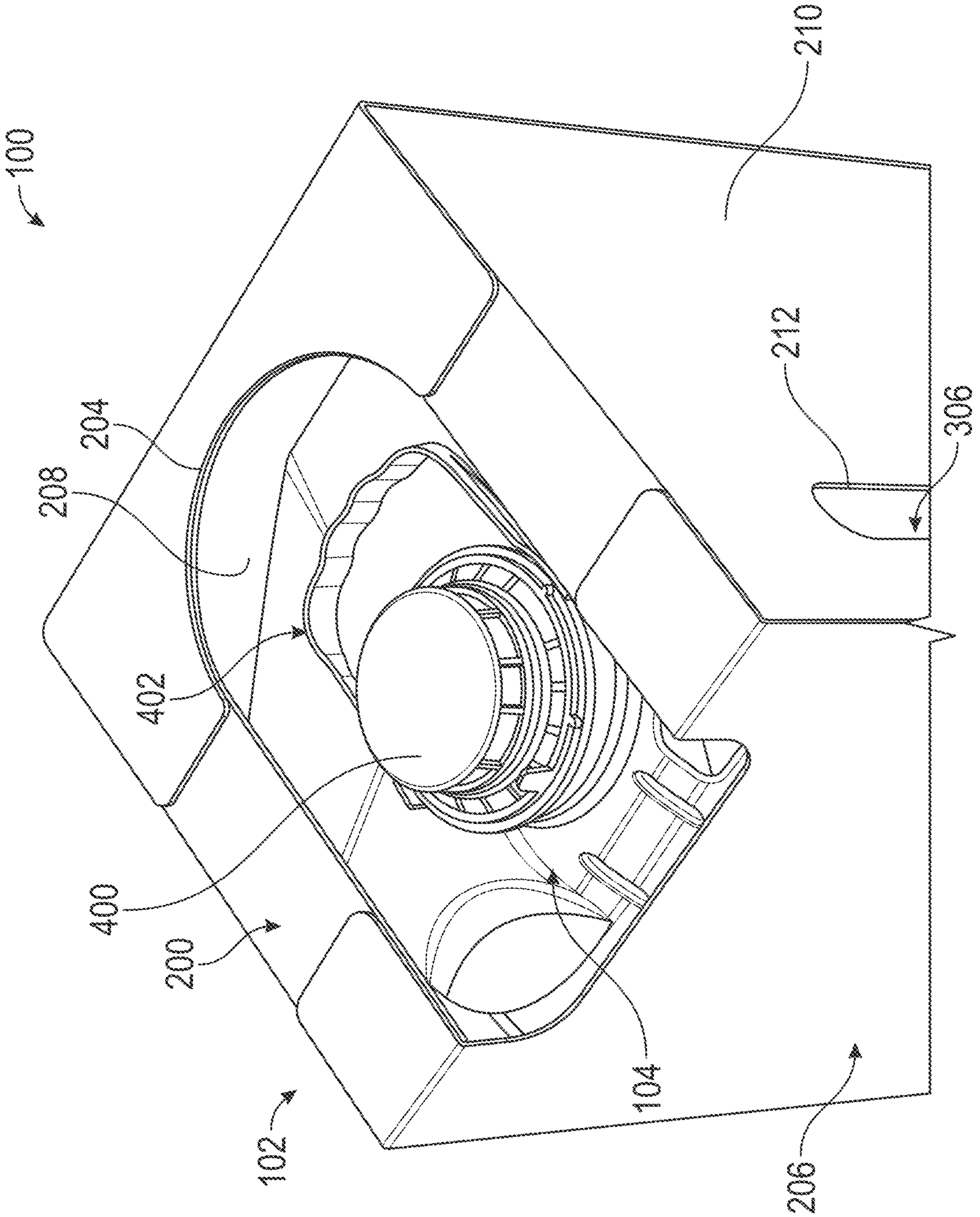
FIG. 8 is a front perspective view of yet another integrated liquid container system, according to an aspect.

In some aspects, as illustrated in FIG. 8, the integrated liquid container system 100 also includes a bottle handle, e.g., container handle 402 disposed proximate to the neck bottom portion 312. The container handle 402 is configured to be gripped by a user (i) to move, vertically and/or laterally, the integrated liquid container system 100, or (ii) to pour out (e.g., remove, etc.) liquid within the container inner cavity 308. In some cases, movement and pouring may occur simultaneously.

Figure 9:
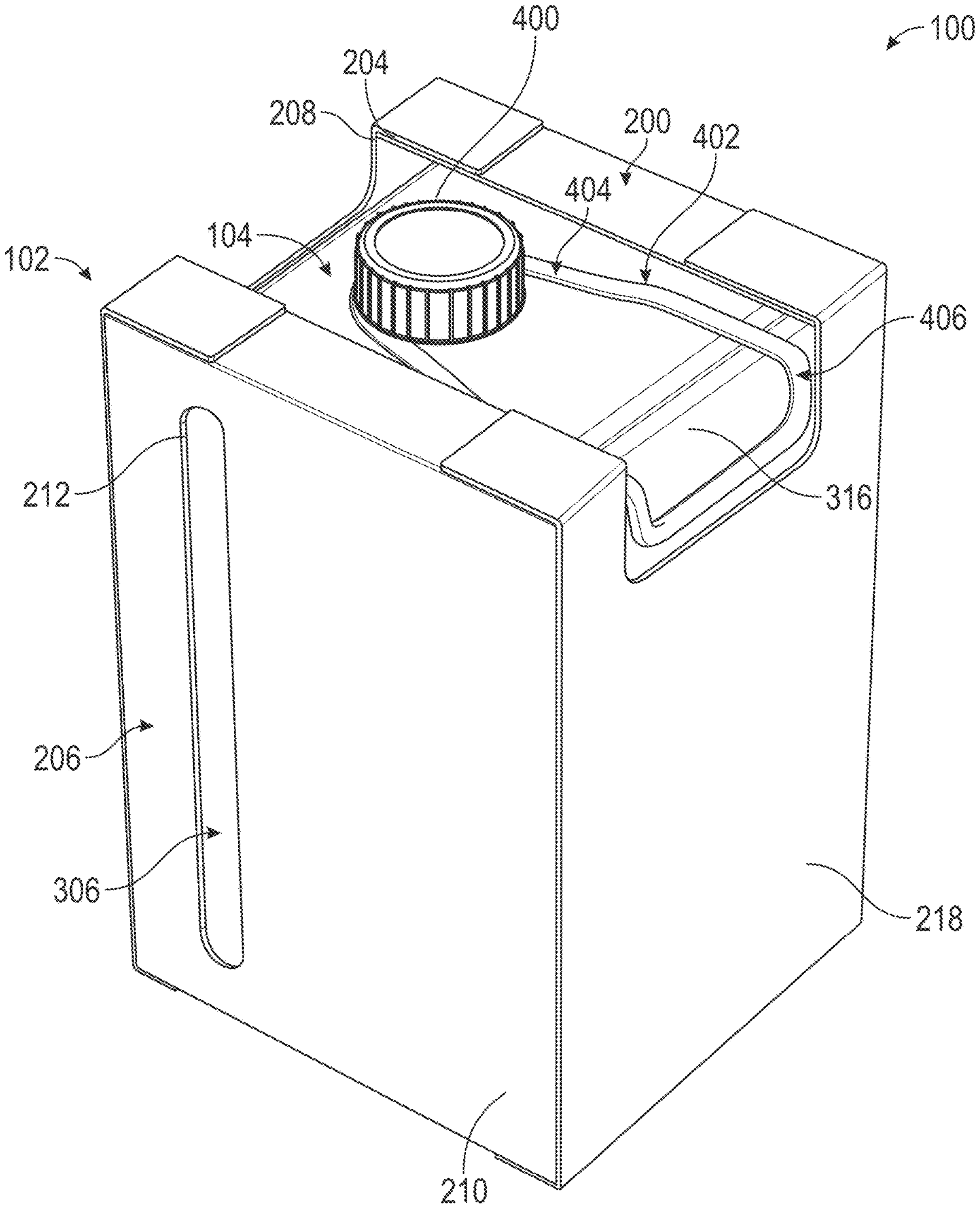
FIG. 9 is a rear perspective view of yet another integrated liquid container system, according to an aspect.

In some aspects, as illustrated in FIG. 9, the container handle 402 includes a first portion 404, proximate the cap 400, and a second portion 406 extending outwardly from the first portion 404. The liquid delivery container 104 includes a side surface 314 and a recess 316 extending inwardly within the side surface 314 of the liquid delivery container 104. The container handle 402 is configured to extend from an uppermost surface of the liquid delivery container 104 (e.g., container top portion 300) to the recess 316, such that at least the second portion 406 of the container handle 402 is configured to be stowed in the recess 316.

Figure 3:
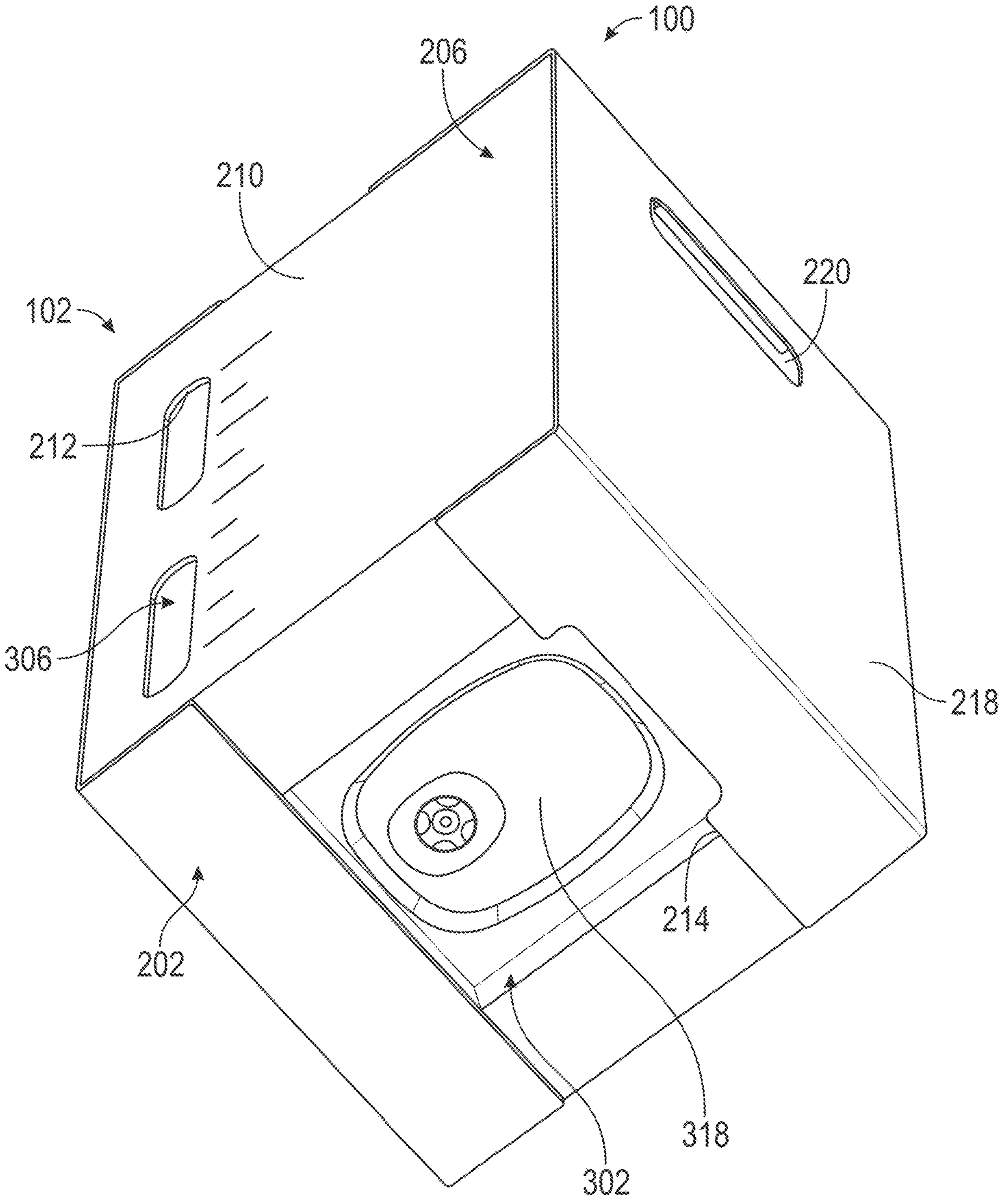
FIG. 3 is a bottom perspective view of the integrated liquid container system of FIGS. 1 and 2, according to an aspect.
Figure 4:
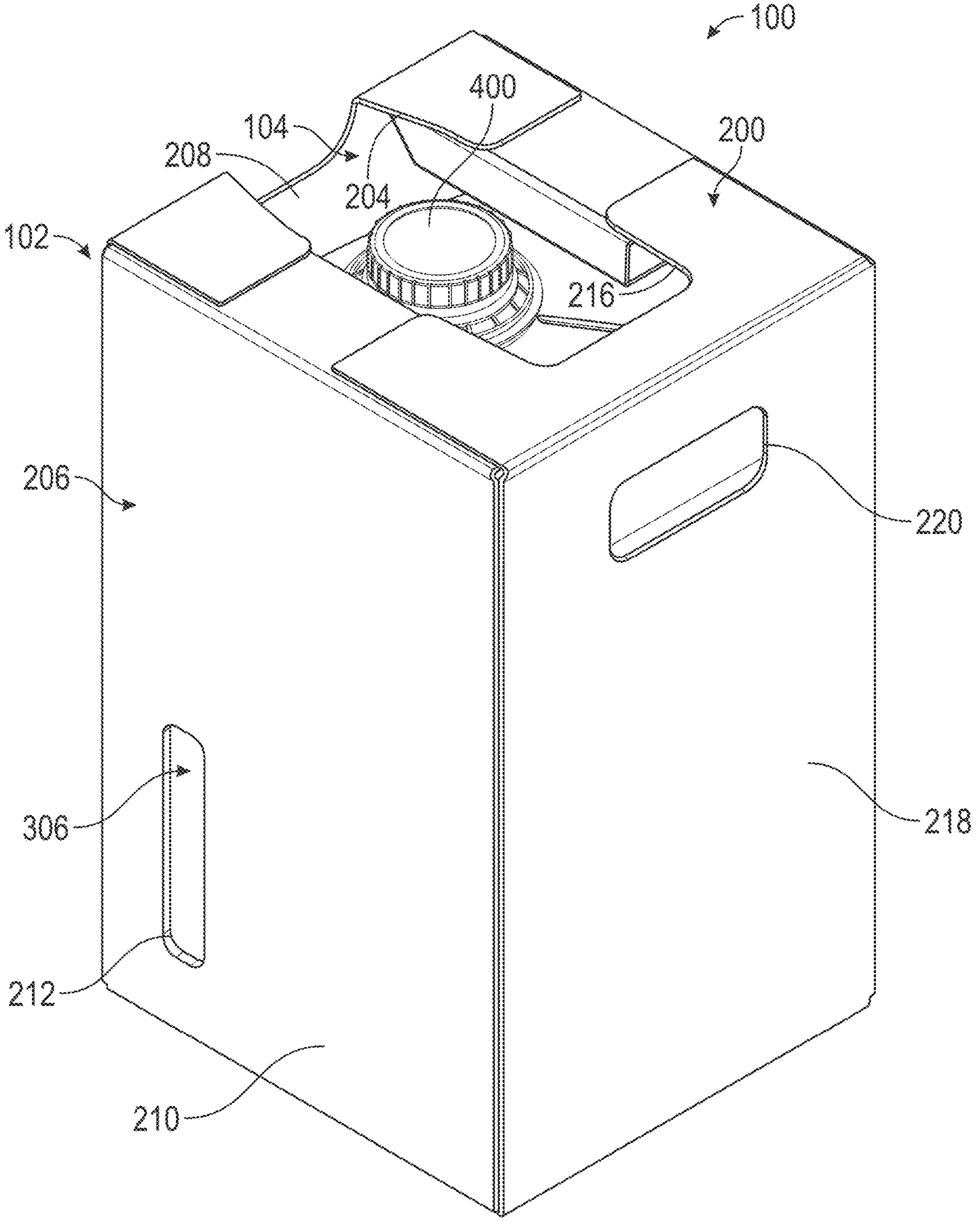
FIG. 4 is a rear perspective view of another integrated liquid container system, according to an aspect.

In some aspects, illustrated in FIG. 3, the housing bottom portion 202 includes a pouring aperture 214 and the container bottom portion 302 includes a pouring indent 318. In some aspects, the pouring indent 318 is a substantially curvilinear recess formed in an underside of the container bottom portion 302. The pouring indent 318 of the container bottom portion 302 is configured to at least partially face the pouring aperture 214 of the housing bottom portion 202. In these aspects, the pouring indent 318, accessible to a user via the pouring aperture 214, allows the user to grip the integrated liquid container system 100 from below. This provides the user with a better grip (e.g., handle, etc.) on the liquid container system 100 and improves the user's control of the liquid container system 100 when pouring out liquid within the container inner cavity 308 via the neck 304.

Figure 27:
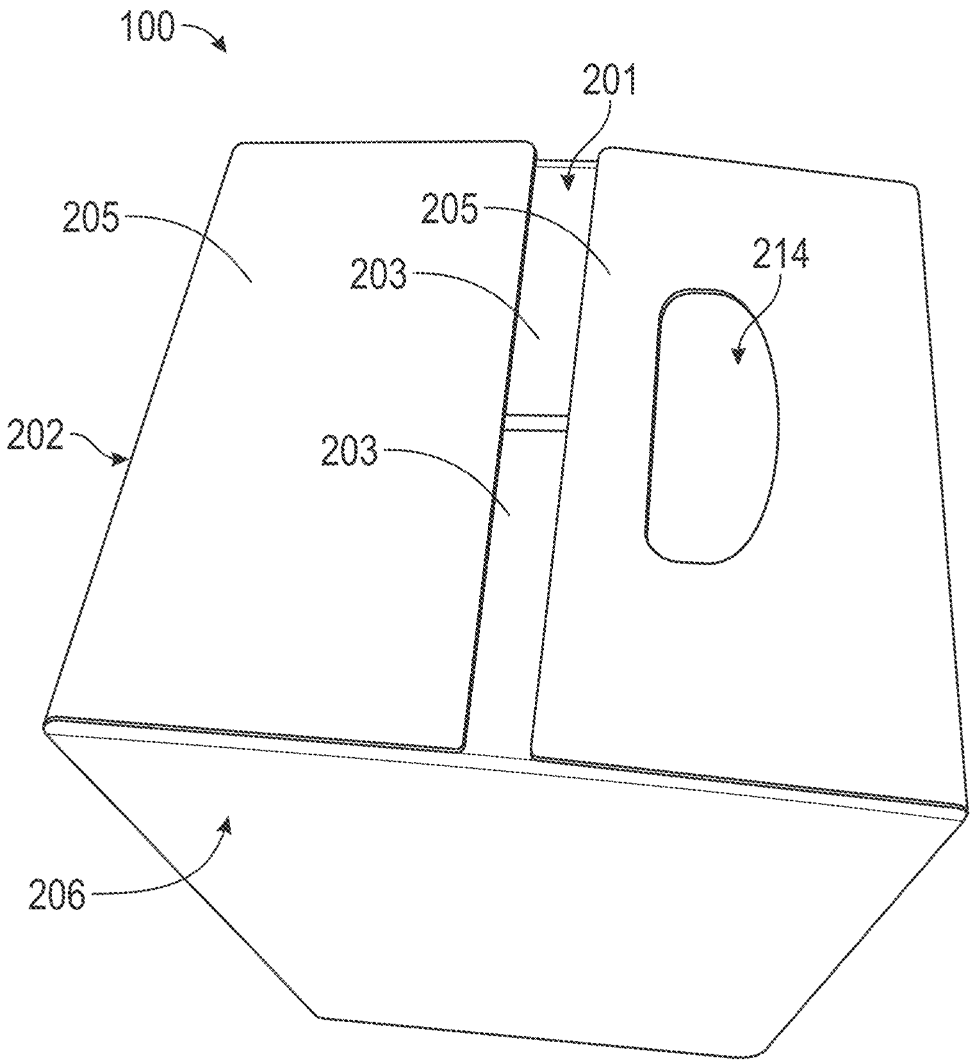
FIG. 27 is a bottom perspective view of the integrated liquid container system of FIGS. 25 and 26, according to an aspect.

In another aspect illustrated in FIG. 27, the housing bottom portion 202 includes a pouring aperture 214 that is an elongate slot. The container bottom portion 302 may or may not include a pouring indent 318 as described above, in FIG. 3. Unlike in the previous example, here the pouring aperture 214 allows the user to grip the housing 102 of the integrated liquid container system 100 from below. With such a design, the user does not necessarily grasp the liquid delivery container 104 itself. In the current example, the housing bottom portion 202 is defined by a plurality of bottom flaps 201 (four flaps in this example) that extend inwardly from the housing body portion 206. Cumulatively, the plurality of bottom flaps 201 extend substantially across the bottom of the housing body portion 206. The bottom flaps can be generally consistent with the construction of the top flaps described below. Each of the plurality of bottom flaps 201 overlaps with at least one other of the plurality of bottom flaps 201. More particularly, in the current example, each flap of the plurality of bottom flaps 201 overlaps with two other flaps of the plurality of bottom flaps 201. Two inner bottom flaps 203 extend inwardly from opposite sides of the housing body portion 206. Two outer bottom flaps 205 extend inwardly from opposite sides of the housing body portion 206. The two inner bottom flaps 203 extend perpendicularly to the two outer bottom flaps 205. Each of the two inner bottom flaps 203 overlap with each of the two outer bottom flaps 205. The plurality of bottom flaps 201 are secured together with any appropriate securing material such as adhesive, staples, and the like. According to one aspect, the pouring aperture 214 is defined by the two inner bottom flaps 203 and one outer bottom flap 205. Such a configuration may advantageously improve the structural stability of the housing 102 when it is grasped through the pouring aperture 214.

Figure 5:
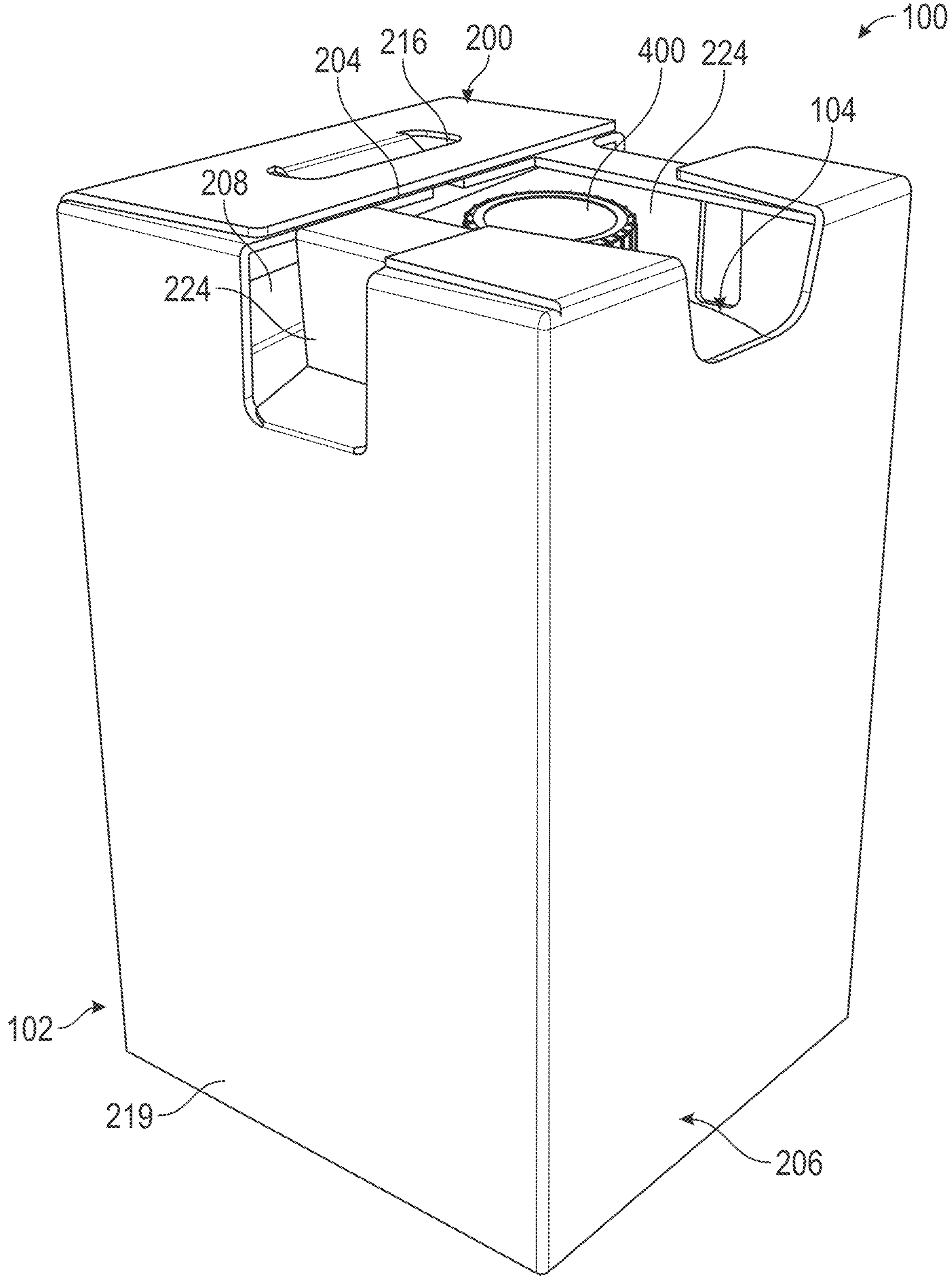
FIG. 5 is a front perspective view of yet another integrated liquid container system, according to an aspect.
Figure 6:
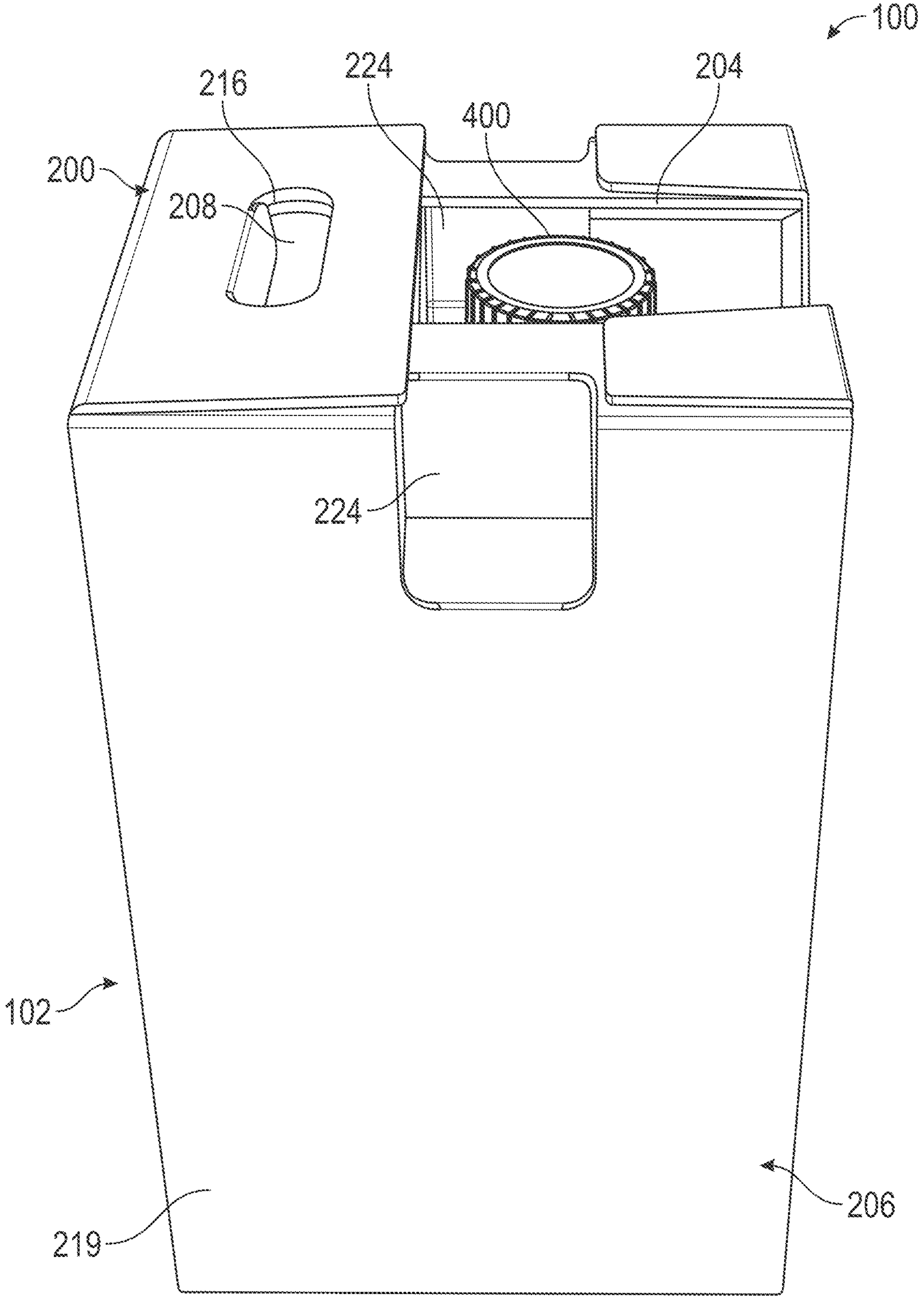
FIG. 6 is a side perspective view of the integrated liquid container system of FIG. 5, according to an aspect.
Figure 7:
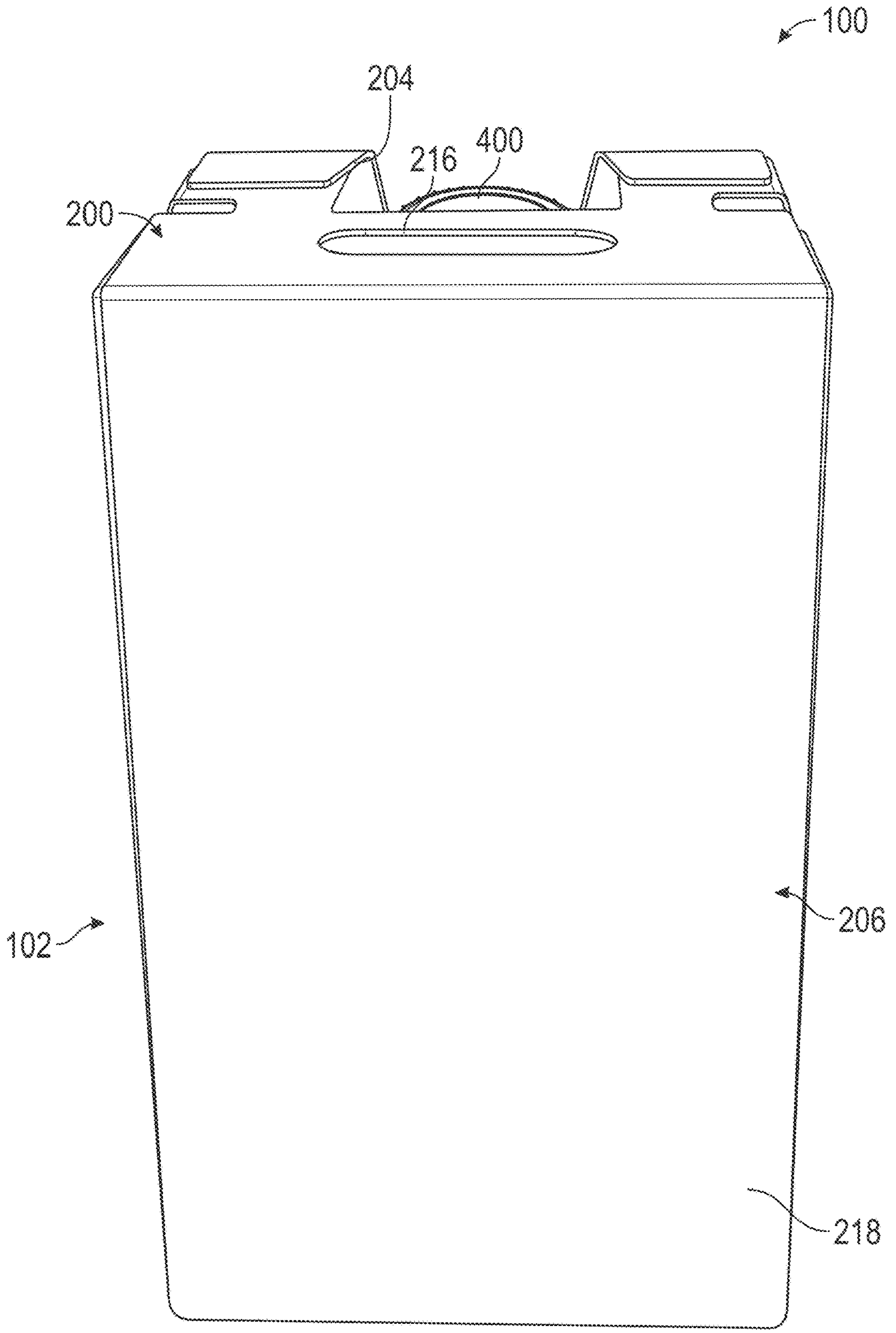
FIG. 7 is a rear perspective view of the integrated liquid container system of FIGS. 5 and 6, according to an aspect.

In some aspects, illustrated in FIGS. 1-4 and FIGS. 25-26, the housing top portion 200 further includes a first handle aperture 216 extending through the housing top portion 200. The housing body portion 206 further includes a second surface 218 perpendicular to the first surface 210 and a second handle aperture 220 extending through the second surface 218 of the housing body portion 206 (particularly visible in FIG. 2). The first handle aperture 216 and the second handle aperture 220 are configured to be gripped by the user, by receiving at least a portion of a hand from the user, (i) to move, vertically and/or laterally, the integrated liquid container system 100, or (ii) to pour out liquid within the container inner cavity 308. In these aspects, the liquid delivery container 104 includes the recess 316, which eases gripping the integrated liquid container system 100 via the first handle aperture 216 and/or the second handle aperture 220. In other aspects, the integrated liquid container system only includes the first handle aperture 216 of the housing top portion 200 (e.g., does not include the the second handle aperture 220 of the housing body portion 206) as illustrated in FIG. 7. In other aspects, the integrated liquid container system only includes the second handle aperture 220 of the housing body portion 206 (e.g., does not include the first handle aperture 216 of the housing top portion 200). As illustrated in FIGS. 5 and 6, the housing body portion 206 further includes a third surface 219 opposing the first surface 210 and perpendicular to the second surface 218.

In various aspects, the housing top portion 202 is constructed of the same materials as the housing body portion 206. According to some aspects, the housing top portion 202 is one or more flaps 207 extending across the top of the housing body portion 206. In accordance with some aspects, one or more flaps 207 extends at least partially across the housing top portion 206 from one surface of the housing body portion 206 towards an opposite surface of the housing body portion 206. According to various aspects, the housing top portion 202 is defined by a plurality of top flaps 201 (four flaps in some examples) that extend inwardly from the housing body portion 206. Cumulatively, the plurality of top flaps 207 can extend substantially across the top of the housing body portion 206. Each of the plurality of top flaps 207 overlaps with at least one other of the plurality of top flaps 207.

More particularly, in the various examples, each flap of the plurality of top flaps 207 overlaps with two other flaps of the plurality of top flaps 207. Two inner top flaps 209 extend inwardly from opposite sides of the housing body portion 206. Two outer top flaps 211 extend inwardly from opposite sides of the housing body portion 206. The two inner top flaps 209 extend perpendicularly to the two outer top flaps 211. Each of the two inner top flaps 209 overlap with each of the two outer top flaps 211. In some examples, each of the plurality of flaps 207 is integral with a corresponding side surface of the housing body portion 206. Each of the plurality of flaps 207 can be an extension of a corresponding side surface of the housing body portion 206. In such examples, each flap can be folded relative to its corresponding side surface of the housing body portion 206 to be approximately perpendicular to the corresponding side surface. The plurality of top flaps 207 are secured together with any appropriate securing material such as adhesive, fasteners, and the like. According to one aspect depicted in FIGS. 25 and 26, the first handle aperture 216 is defined by the two inner top flaps 209 and at least one outer top flaps 211. Such a configuration may advantageously improve the structural stability of the housing 102 when it is grasped through the first handle aperture 216. According to some aspects the first handle aperture 216 is defined by both outer top flaps 211. In such an example, the two outer top flaps 211 overlap with each other. According to one aspect, the two outer top flaps 211 are substantially coextensive with each other. According to yet other aspects, the two outer tops flaps 211 do not overlap with each other According to one aspect consistent with FIGS. 1 and 2, the first handle aperture 216 is defined by one outer top flap 211 and two inner top flaps 209.

Figure 10:
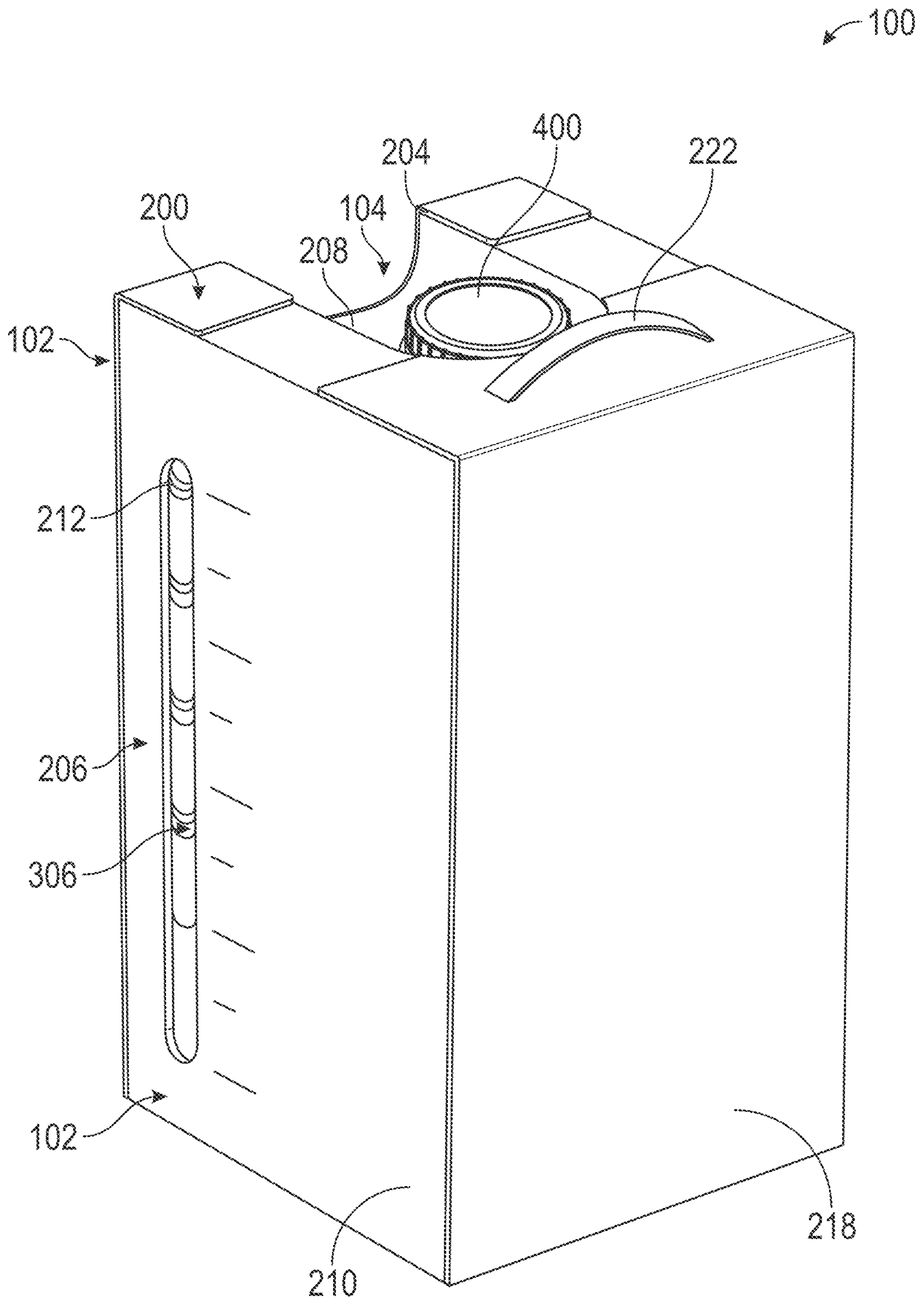
FIG. 10 is a rear perspective view of yet another integrated liquid container system, according to an aspect.
Figure 11:
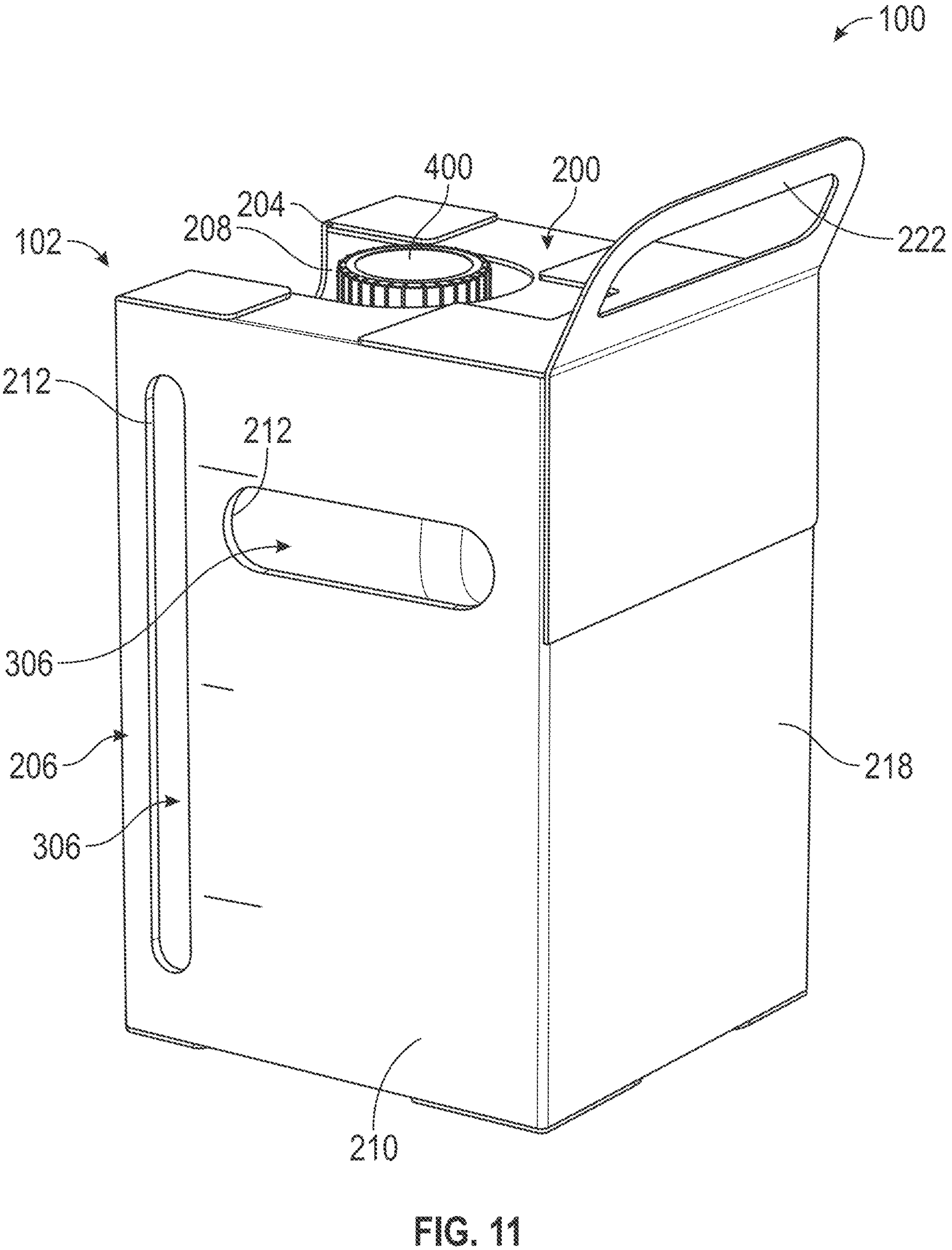
FIG. 11 is a rear perspective view of yet another integrated liquid container system, according to an aspect.

In some aspects, illustrated in FIGS. 10 and 11, the housing 102 includes a housing handle 222 coupled to the housing top portion 200. In some aspects, illustrated in FIG. 10, the housing handle 222 is made of paperboard. In other aspects, illustrated in FIG. 11, the housing handle 222 is made of corrugated cardboard.

The liquid delivery container 104 includes a center axis 320 (e.g., axial center, etc.). In some aspects, illustrated in FIGS. 13-15, the neck 304 is disposed along the center axis 320 of the liquid delivery container 104. The neck 304 includes a center axis 322. In these aspects, the center axis 320 of the liquid delivery container 104 and the center axis 322 of the neck 304 coincide. These aspects provide some protection against unintentional pours. For example, if the integrated liquid container system 100 is tipped such that the second surface 218 of the housing body portion 206 is facing downwards (e.g., towards the ground, etc.) and the cap 400 is detached from the neck top portion 310, the liquid within the container inner cavity 308 will pour out via the neck 304 until the liquid within the container inner cavity 308 reaches a level that is approximately below the center axis 320 of the liquid delivery container 104. This prevents more of the liquid within the container inner cavity 308 from pouring out unintentionally.

Figure 16:
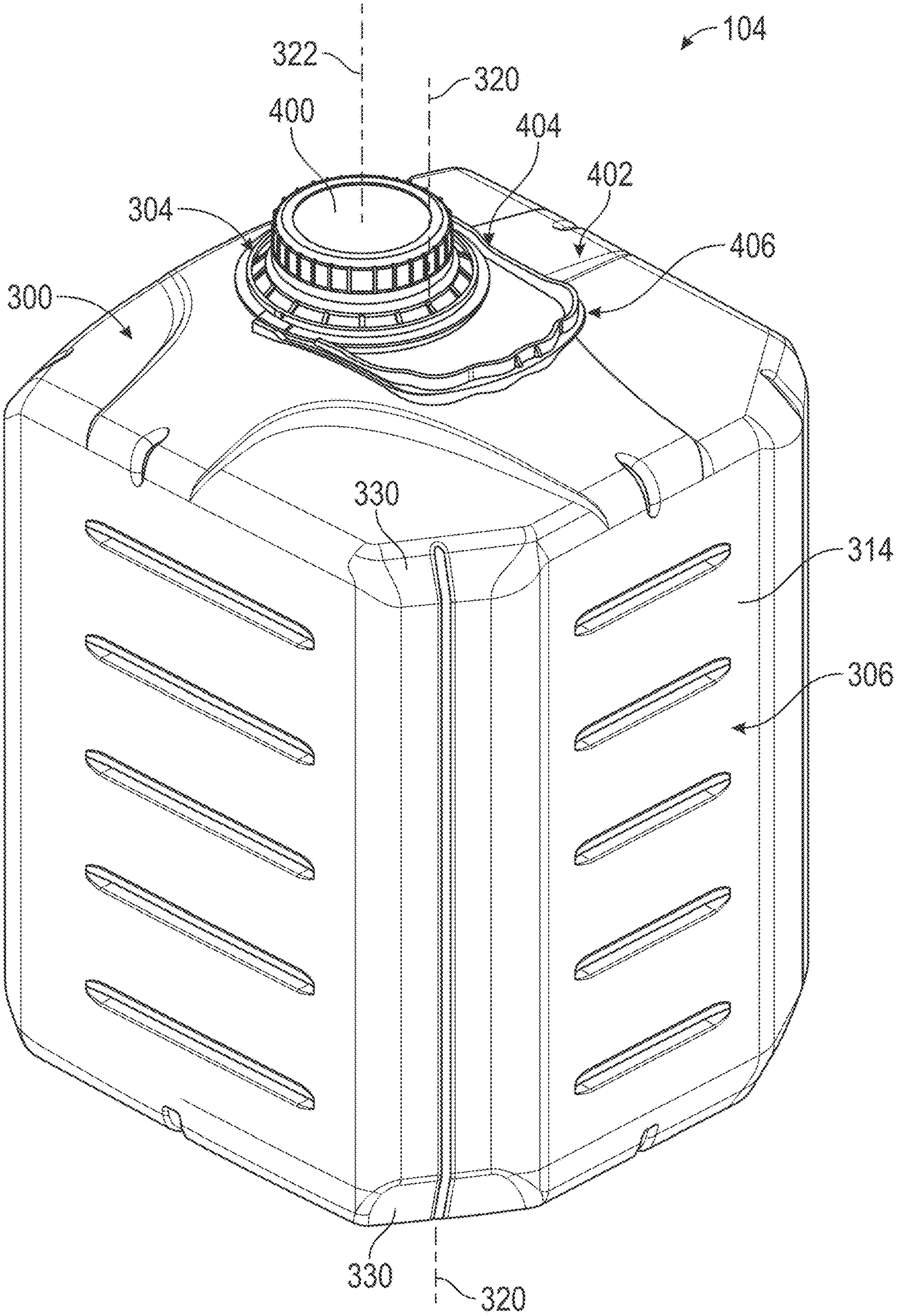
FIG. 16 is a rear perspective view of yet another liquid delivery container, according to an aspect.
Figure 17:
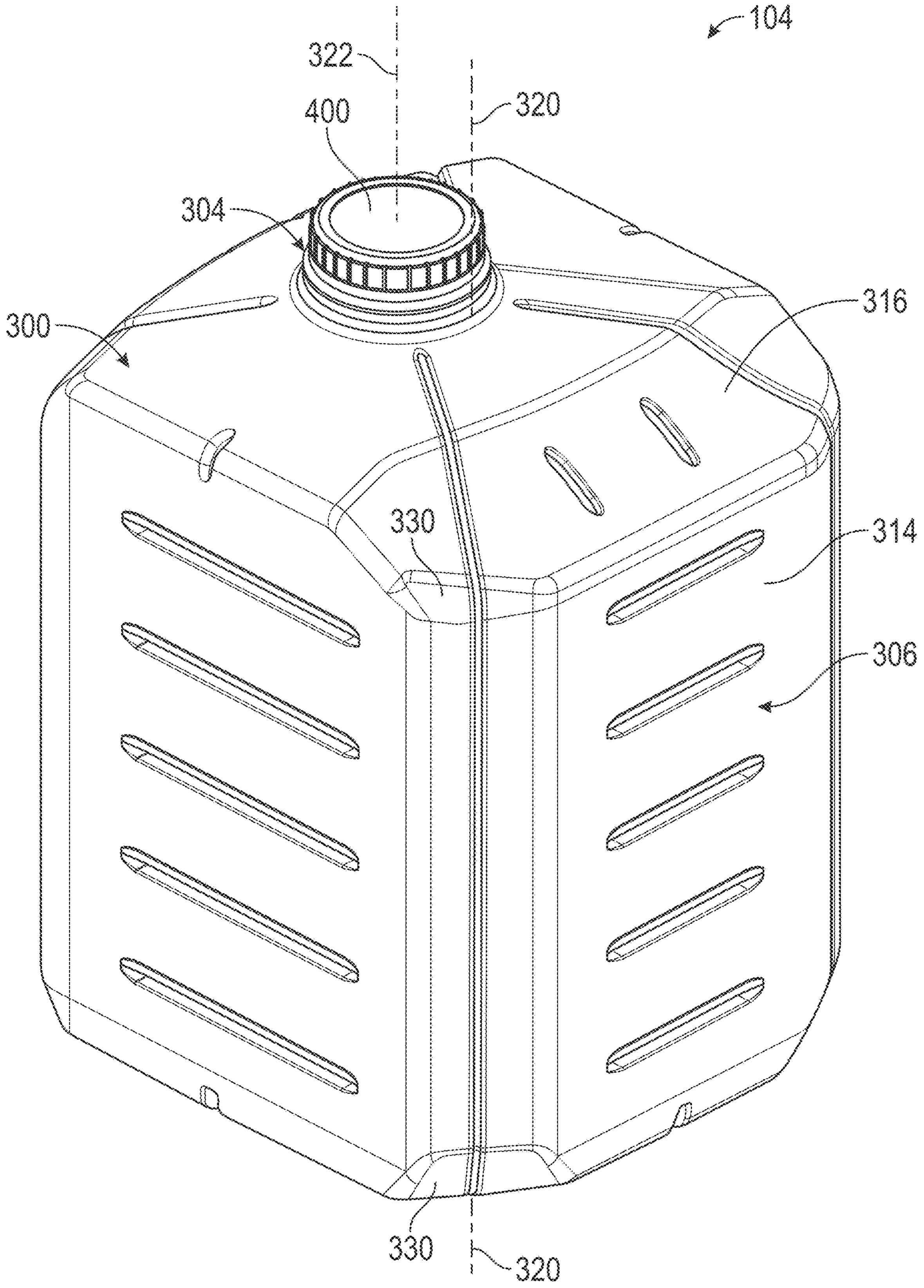
FIG. 17 is a rear perspective view of yet another liquid delivery container, according to an aspect.
Figure 18:
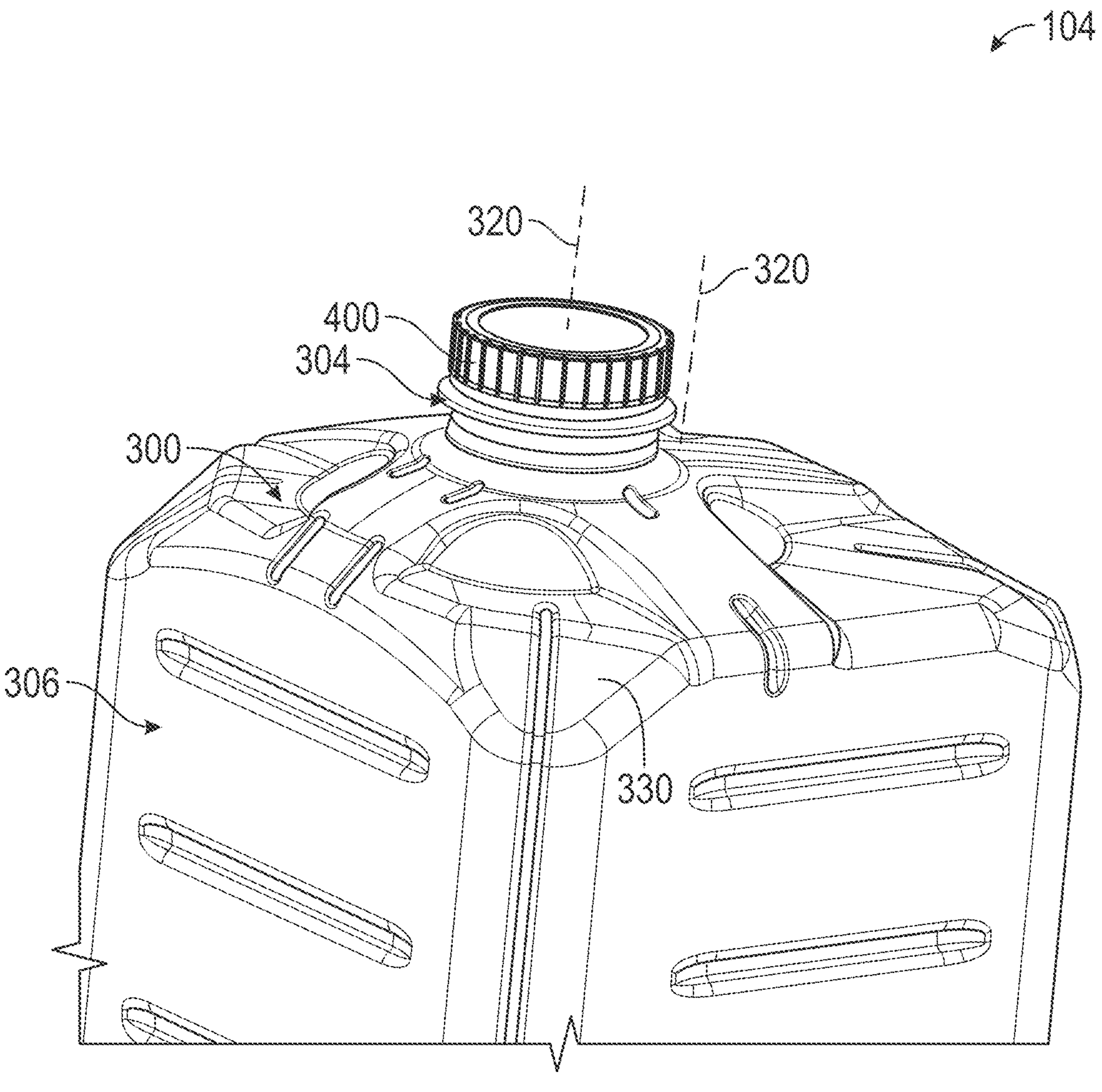
FIG. 18 is a front perspective view of the liquid delivery container of FIG. 17, according to an aspect.

In some aspects, illustrated in FIGS. 16-18, the neck 304 is disposed off-axis of (e.g., away from, not along, etc.) the center axis 320 of the liquid delivery container 104. In these aspects, the center axis 320 of the liquid delivery container 104 and the center axis 322 of the neck 304 are parallel. These aspects ease (e.g., simplify, etc.) pouring the liquid out of the container inner cavity 308 via the neck 304. For example, assuming the integrated liquid container system 100 is intentionally rotated by the user in a direction pointing from the center axis 320 of the liquid delivery container 104 towards the center axis 322 of the neck 304, the liquid will begin to pour out of the container inner cavity 308 via the neck 304 at a first pouring angle. In some aspects, the first pouring angle is between approximately 40 degrees to approximately 55 degrees. For example, the first pouring angle may be approximately 45 degrees to approximately 55 degrees, or approximately 47 degrees to approximately 53 degrees, approximately 49 degrees to approximately 51 degrees. The first pouring angle is smaller than a second pouring angle, where the second pouring angle is where the liquid begins to pour out of the container inner cavity 308 via the neck 304 for the integrated liquid container system 100 with the neck 304 disposed along the center axis 320 of the liquid delivery container 104 (aspects shown in FIGS. 13-15). In some aspects, the second pouring angle is between approximately 55 degrees to approximately 70 degrees. For example, the second pouring angle may be approximately 56 degrees to approximately 68 degrees, approximately 54 degrees to approximately 66 degrees, approximately 59 degrees to approximately 66 degrees, or approximately 61 degrees to approximately 64 degrees, for example.

Figure 19:
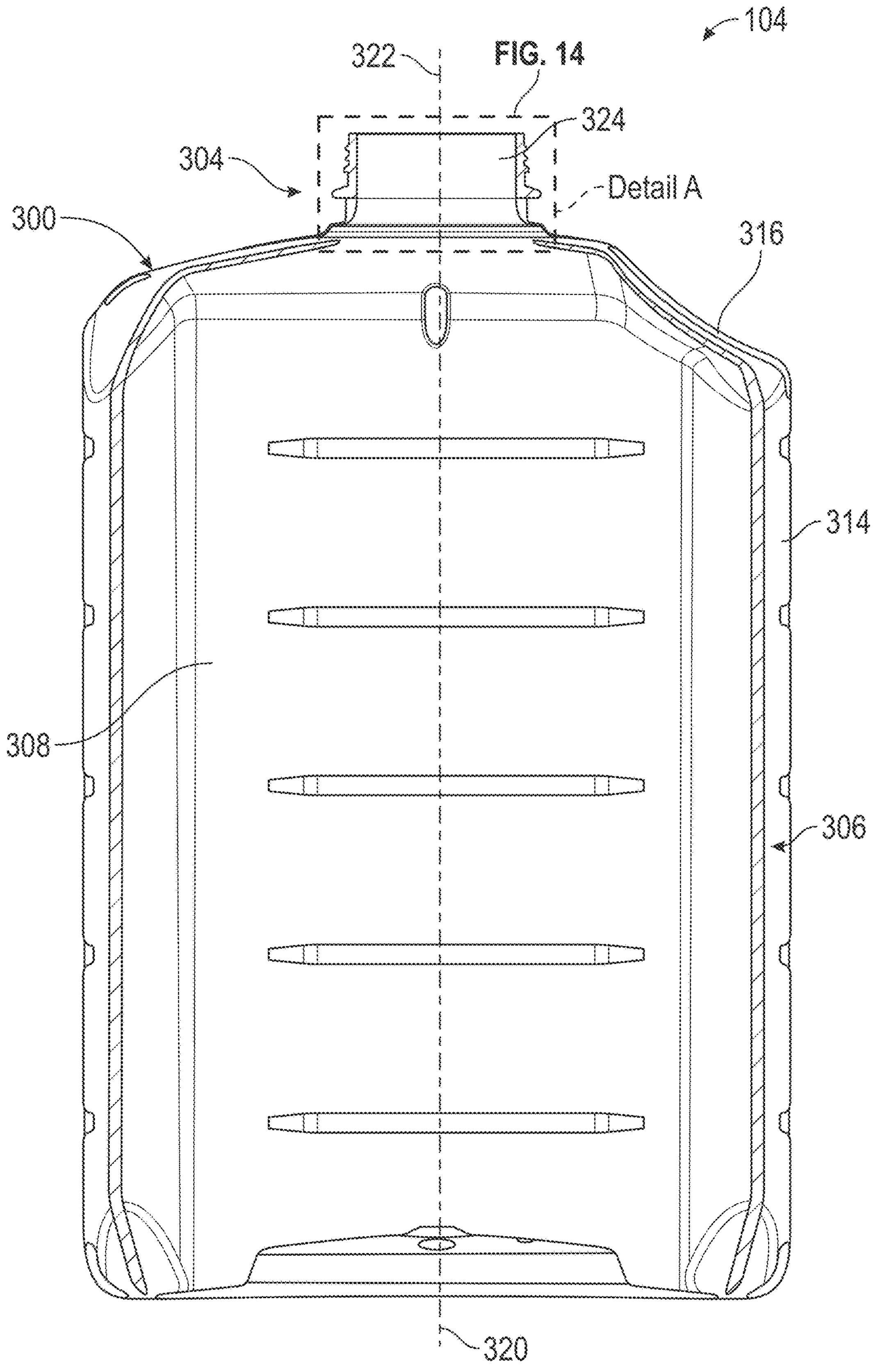
FIG. 19 is a depiction of the liquid delivery container of FIG. 14 including a cross-sectional view taken along line 14-14 in FIG. 14, according to an aspect.
Figure 20:
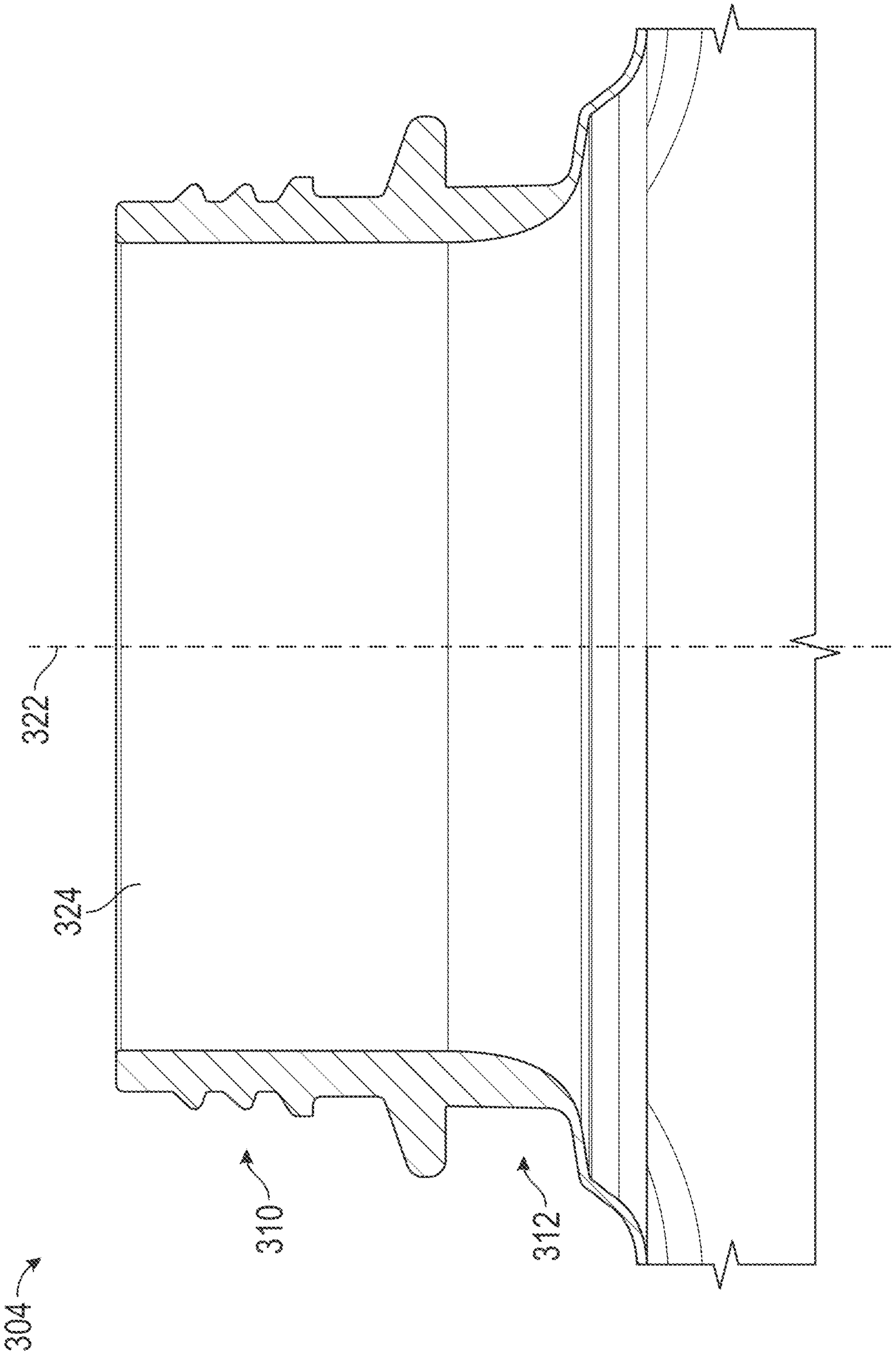
FIG. 20 is a view of Detail A in FIG. 19, according to an aspect.

As illustrated in FIGS. 19 and 20, the neck 304 comprises a continuous inner surface, e.g., first surface 324. The first surface 324 has a substantially constant circumference, such that an outermost portion of the first surface 324 is equidistant from the center axis 322 of the neck 304. The first surface 324 of the neck 304 is structured without protuberances extending circumferentially therefrom (e.g., the first surface 324 of the neck 304). The lack of protuberances on the first surface 324 of the neck 304 allows the first surface 324 of the neck 304 to be substantially level (e.g., smooth, flat, etc.). This allows the liquid pouring out of the container inner cavity 308 via the neck 304 to exit the neck 304 having flow characteristics similar to that of a laminar flow or a transitional flow. This reduces a risk of the liquid splashing unintentionally and improves control of pouring via the user when pouring the liquid out of the container inner cavity 308 via the neck 304, in contrast to the liquid pouring out of the container inner cavity 308 having turbulent flow characteristics. Assuming the liquid flows through the neck 304 such that the entirety of the first surface 324 of the neck 304 is in contact with the liquid, characterizing the liquid passing through the neck 304 as pipe flow (e.g., closed conduit flow, etc.), the Reynolds number range for laminar flow is approximately 0) to approximately 2000 and the Reynolds number range for transitional flow is approximately 2000 to approximately 4000. Assuming the liquid flows through the neck 304 such that only a portion of the first surface 324 of the neck 304 is in contact with the liquid, characterizing the liquid passing through the neck 304 as open channel flow, the Reynolds number range for laminar flow is approximately 0 to approximately 500 and the Reynolds number range for transitional flow is approximately 500 to approximately 1000.

Furthermore, the first surface 324 of the neck 304, as described above, allows for an increase in a pour rate of the liquid delivery container 104, where the pour rate is a mass flow rate of the liquid within the container inner cavity 308 flowing out of the container inner cavity 308 via the neck 304. In some aspects, at the first pouring angle, where the neck 304 is disposed off-axis of the center axis 320 of the liquid delivery container 104 (aspects shown in FIGS. 16-18), the pour rate is between approximately 3.4 pounds/second to approximately 5.4 pounds/second, e.g., 4.4 pounds/second. In other aspects, at the second pouring angle, where the neck 304 disposed along the center axis 320 of the liquid delivery container 104 (aspects shown in FIGS. 13-15), the pour rate is between approximately 4.0 pounds/second to approximately 6.0 pounds/second, e.g., approximately 5.2 pounds/second, approximately 5.4 pounds/second, approximately 5.6 pounds/second, or approximately 5.8 pounds/second. In contrast, a typical container system in the form of a JIB at a typical pouring angle has a pour rate of between approximately 2.2 pounds/second and 4.2 pounds/second. The typical pouring angle is between approximately 30 degrees and approximately 45 degrees. As such, an integrated liquid container system according to the exemplary aspects discussed herein may be constructed such that where the neck 304 is disposed off-axis of the center axis 320 of the liquid delivery container 104, the pour rate of the liquid delivery container 104 may be approximately 40% larger than the pour rate of the typical container system in the form of a JIB. Additionally, where the neck 304 disposed along the center axis 320 of the liquid delivery container 104, the pour rate of the liquid delivery container 104 may be approximately 60% larger than the pour rate of the typical container system in the form of a JIB.

Figure 12:
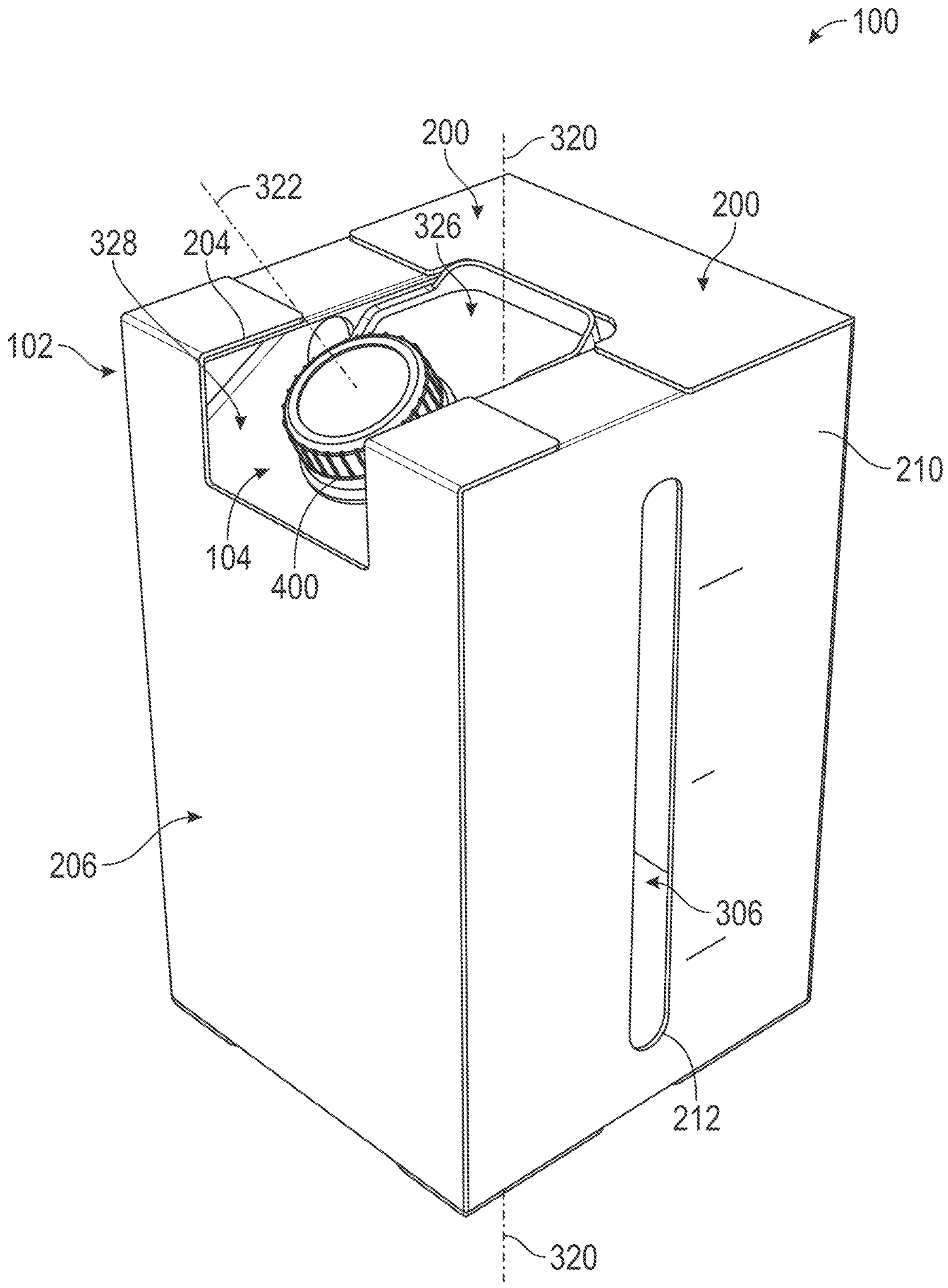
FIG. 12 is a front perspective view of yet another integrated liquid container system, according to an aspect.
Figure 13:
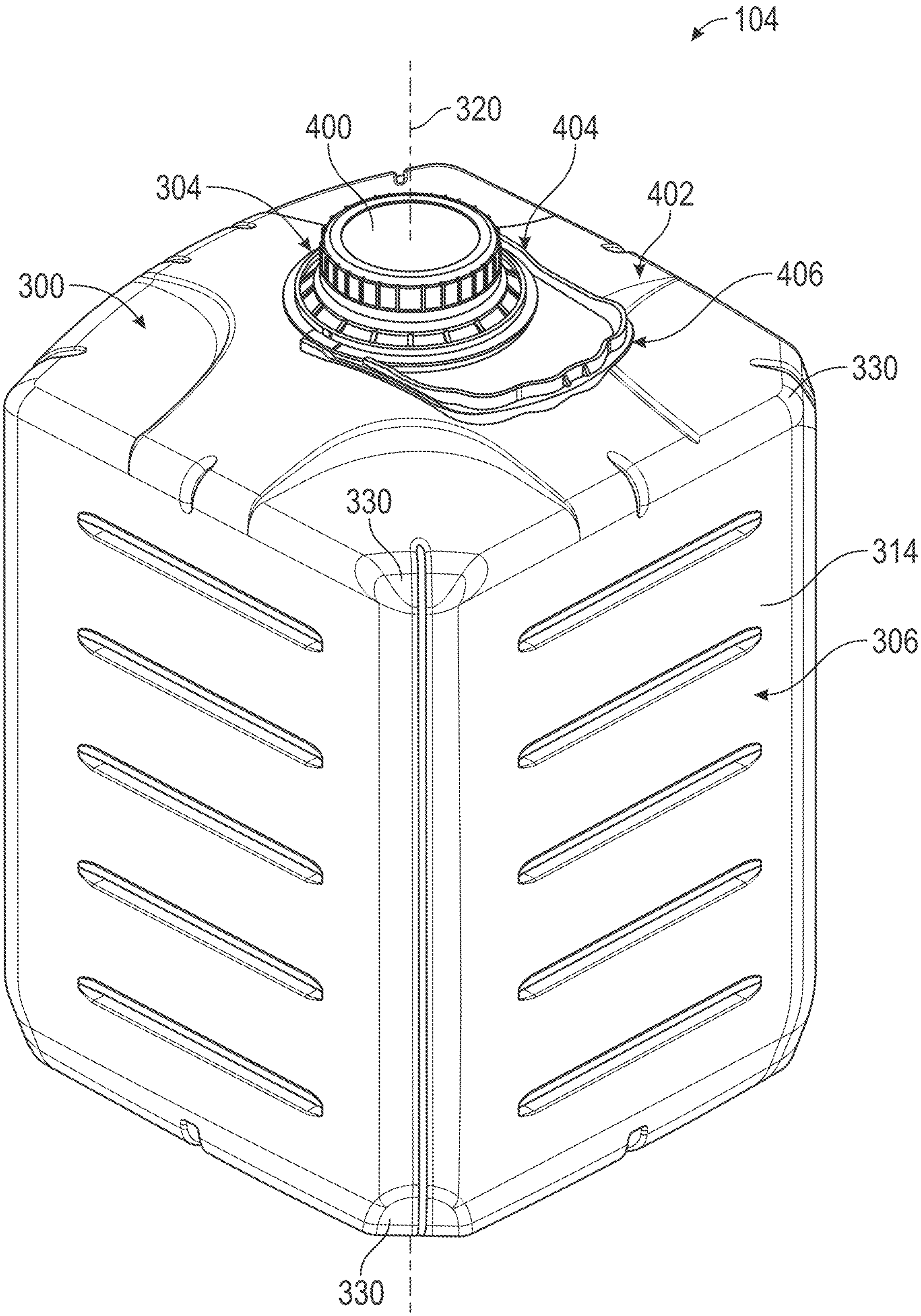
FIG. 13 is a rear perspective view of a liquid delivery container, according to an aspect.
Figure 14:
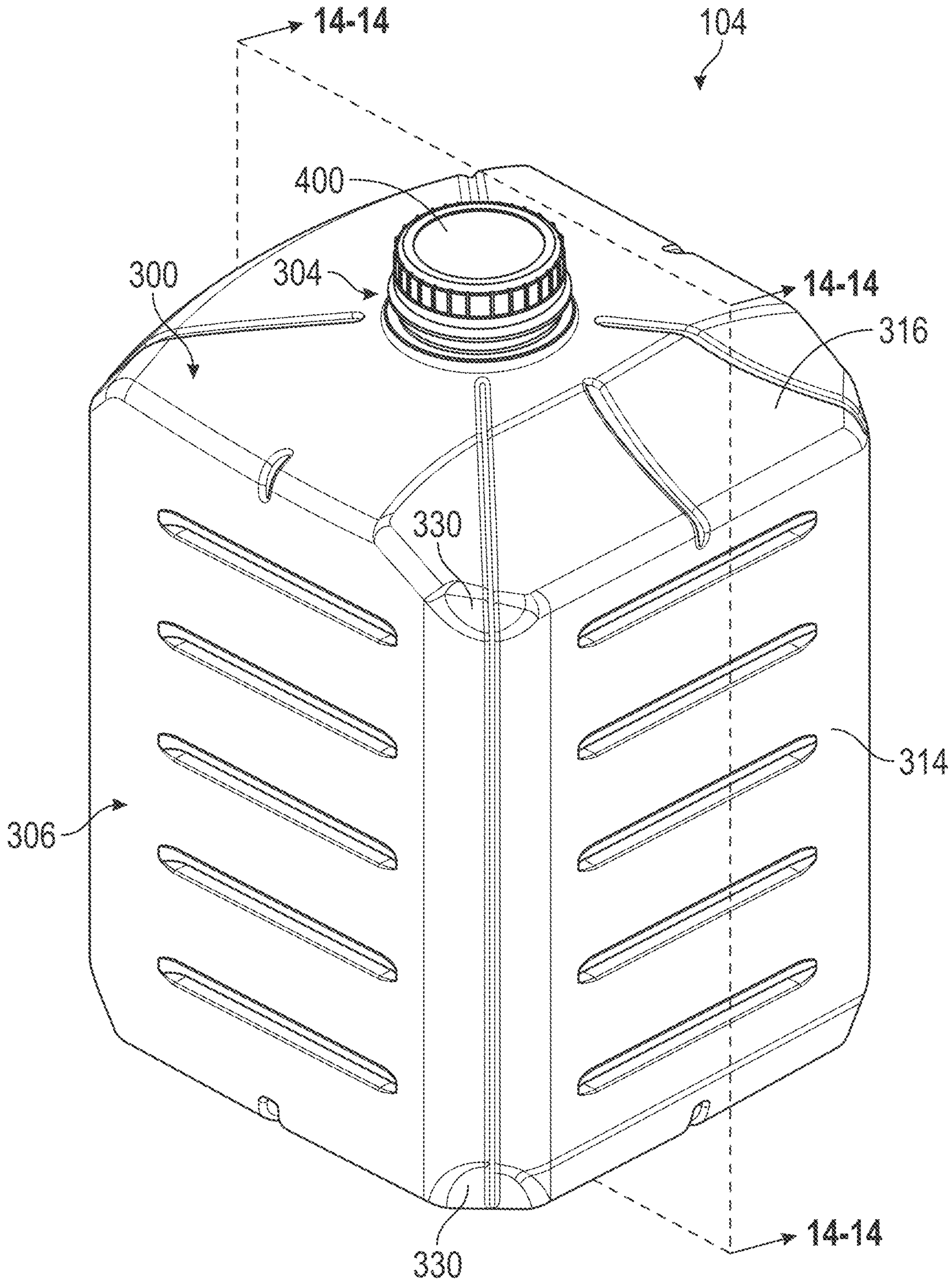
FIG. 14 is a rear perspective view of another liquid delivery container, according to an aspect.
Figure 15:
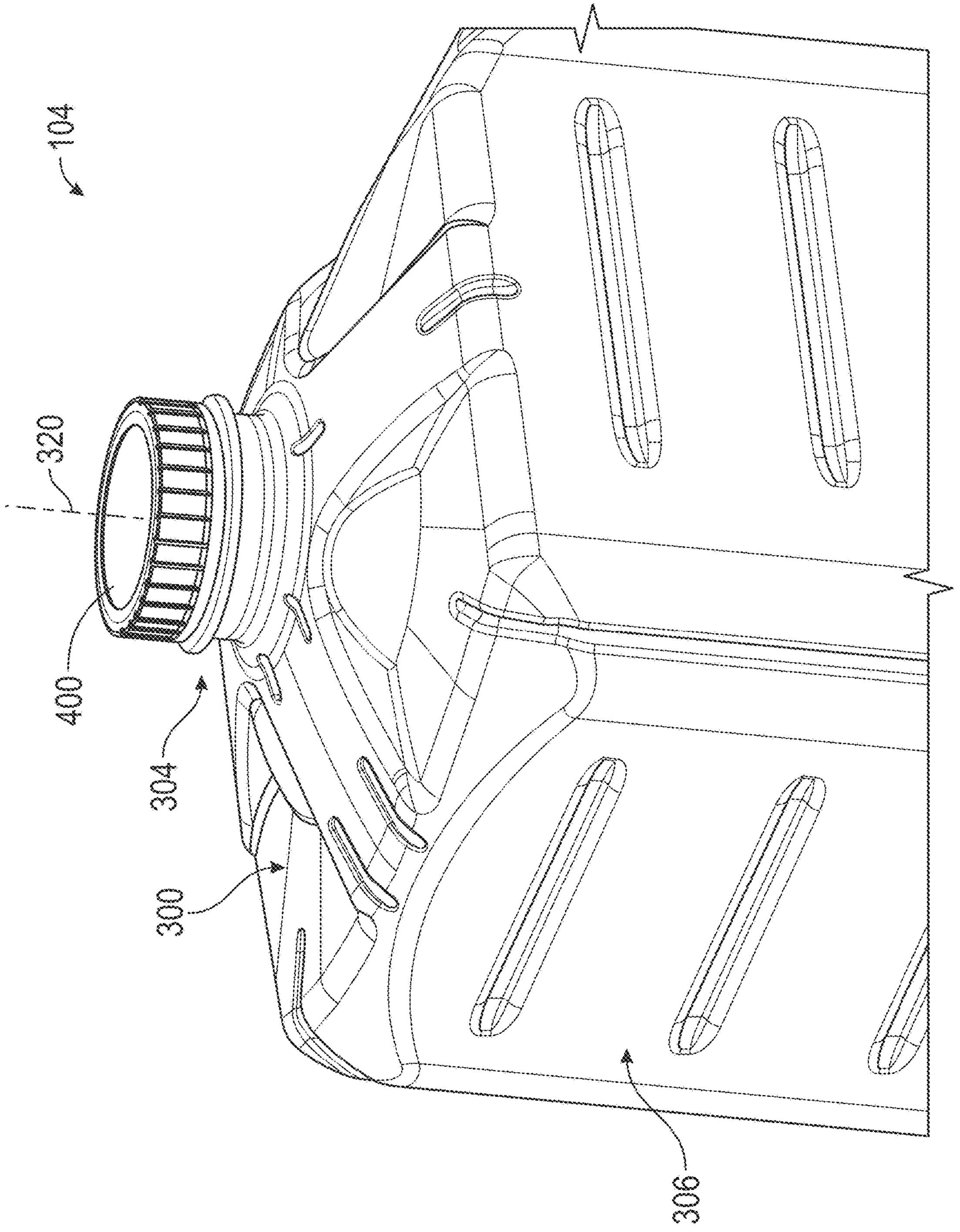
FIG. 15 is a front perspective view of the liquid delivery container of FIG. 14, according to an aspect.

In some aspects, illustrated in FIG. 12, the container top portion 300 includes a first portion 326 parallel to the housing top portion 200 and a second portion 328 inclined with respect to the first portion 326 of the container top portion 300. According to this aspect, the neck 304 is disposed along the second portion 328 of the container top portion 300, such that the center axis 320 of the liquid delivery container 104 and the center axis 322 of the neck 304 intersect. These aspects ease pouring the liquid out of the container inner cavity 308 via the neck 304. For example, assuming the integrated liquid container system 100 is intentionally rotated by the user in the direction pointing from the center axis 320 of the liquid delivery container 104 towards the center axis 322 of the neck 304, the liquid will begin to pour out of the container inner cavity 308 at a third pouring angle, where the third pouring angle is smaller than both the first pouring angle and the second pouring angle.

In some aspects, illustrated in FIGS. 13, 14, and 16-18, the liquid delivery container 104 includes delta corners 330 along a periphery of the container top portion 300 and/or a periphery of the container bottom portion 302. In some aspects, the liquid delivery container 104 includes the delta corners 330 proximate to a specific surface (e.g., the side surface 314, etc.) of the liquid delivery container 104. In some examples, the delta corners 330 reduce a mass of material required to manufacture the liquid delivery container 104 (relative to not utilizing the delta corners 330). In some examples, the delta corners 330 improve distribution of pressure within the liquid delivery container 104 caused by the liquid housed within the container inner cavity 308. In some aspects, the housing 102 includes corners disposed along a periphery of the housing top portion 200 and/or a periphery of the housing bottom portion 202. In some aspects, each of the corners of the housing 102 are defined by a point where all edges of the respective corner intersect. In some examples, at least one of the delta corners 330 is disposed on a corner plane, where a normal vector to the corner plane includes a direction equal to, or approximately equal to, a direction of the point of at least one corner of the housing 102. In some examples, at least one of the delta corners 330 includes a substantially flat surface. In some examples, at least one of the delta corners 330 includes a substantially curved surface.

The following dimensions are presented as examples of the aspects discussed in this disclosure and should not be considered as limiting to such aspects: a length between the neck top portion 310 and the container bottom portion 302 is between approximately 390 mm to approximately 400 mm. For example, the length between the neck top portion 310 and the container bottom portion 302 may be approximately 390 mm to approximately 400 mm, approximately 392 mm to approximately 398 mm, approximately 393 mm to approximately 397 mm, or approximately 393.5 mm to approximately 395.5 mm. In some aspects, the length between the neck top portion 310 and the container bottom portion 302 is preferably approximately 394 mm, or more preferably approximately 394.6 mm. A length of the neck top portion 310 is between approximately 10 mm to approximately 25 mm, e.g., approximately 17 mm. The length of the neck top portion 310 may be between approximately 15 mm to approximately 25 mm, approximately 20 mm to approximately 24 mm, or approximately 21 mm to approximately 23 mm. Preferably, in any aspect, the length of the neck top portion 310 may be approximately 22 mm. A length of the neck bottom portion 312 is between approximately 6 mm and approximately 13 mm: for example, the length of the neck bottom portion 312 may be approximately 6 mm to approximately 13 mm, approximately 8 mm to approximately 11 mm, or approximately 8.5 mm to approximately 10.5 mm. A length between the container top portion 300 and the container bottom portion 302 is between approximately 325 mm to approximately 410 mm. For example, the length between the container top portion 300 and the container bottom portion 302 may be between approximately 325 mm to approximately 365 mm, approximately 335 mm to approximately 365 mm, or approximately 355 mm to approximately 360 mm. Preferably, in any aspect, the length between the container top portion 300 and the container bottom portion 302 may be between approximately 359.3 mm to approximately 355.3 mm.

Further, the following dimensions are presented as additional examples of the aspects discussed in this disclosure and should not be considered as limiting to such aspects: an outer diameter of the neck 304 is approximately 60 mm to approximately 65 mm. For example, the outer diameter of the neck 304 may be between approximately 60 mm to approximately 65 mm, approximately 61 mm to approximately 64 mm, or approximately 62 mm to approximately 63 mm. Preferably, in any aspect, the outer diameter of the neck 304 may be approximately 61.6 mm. A depth of the pouring indent 318 is between approximately 17 mm to approximately 37 mm. For example, the depth of the pouring indent 318 may be between approximately 17 mm to approximately 37 mm, approximately 20 mm to approximately 34 mm, approximately 23 mm to approximately 33 mm, approximately 26 mm to approximately 30 mm, or approximately 32.5 mm to approximately 34.5 mm. A width of the pouring indent 318 is between approximately 50 mm to approximately 120 mm. For example, the width of the pouring indent 318 may be between approximately 50 mm to approximately 120 mm, approximately 60 mm to approximately 110 mm, approximately 70 mm to approximately 100 mm, approximately 80 mm to approximately 90 mm, or approximately 75.5 mm to approximately 85.5 mm. Preferably, in any aspect, the width of the pouring indent 318 may be 75.8 mm. A length of the pouring indent 318 is between approximately 110 mm to approximately 140 mm. For example, the length of the pouring indent 318 may be between approximately 110 mm to approximately 140 mm, approximately 115 mm to approximately 135 mm, approximately 120 mm to approximately 130 mm, or approximately 122.5 mm to approximately 127.5 mm. Preferably, in any aspect, the length of the pouring indent 318 may be between approximately 114 mm to approximately 132.5 mm. A width of the liquid delivery container 104 is between approximately 220 mm to approximately 250 mm. For example, the width of the liquid delivery container 104 may be between approximately 220 mm to approximately 250 mm, approximately 225 mm to approximately 245 mm, approximately 230) mm to approximately 240 mm, or approximately 232.5 mm to approximately 237.5 mm. Preferably, in any aspect, the width of the liquid delivery container 104 may be between approximately 229 mm to approximately 242 mm.

Additionally, the following dimensions are presented as still further examples of the aspects discussed in this disclosure and should not be considered as limiting to such aspects: a fill point volume capacity (e.g., a safe liquid carrying capacity, not a maximum liquid capacity, etc.) of the liquid delivery container 104 is between approximately 15.000 ml to 20.000 ml. For example, the fill point volume capacity of the liquid delivery container 104 may be between approximately 15.000 ml to approximately 20.000 ml, approximately 16.000 ml to approximately 19.000 ml, or approximately 17.000 ml to approximately 18.000 ml. Preferably, in any aspect, the fill point volume capacity of the liquid delivery container 104 may be between approximately 17.210 ml to approximately 17.450 ml. A mass of the liquid delivery container 104 is approximately 150 grams to approximately 200 grams. For example, the mass of the liquid delivery container 104 may be between approximately 150 grams to approximately 200 grams, approximately 160 grams to approximately 190 grams, approximately 165 grams to approximately 185 grams, or approximately 178.5 grams to 183.5 grams. Preferably, in any aspect, the mass of the liquid delivery container 104 may be approximately 180 grams. In any aspect, the neck may be manufactured to reduce the mass thereof. A mass of the neck 304 is approximately 5 grams to approximately 25 grams. For example, the mass of the neck 304 may be between approximately 5 grams to approximately 25 grams, approximately 8 grams to approximately 22 grams, approximately 12 grams to approximately 18 grams or approximately 13 grams to approximately 16 grams. Preferably, in any aspect, the mass of the neck 304 may be approximately 22 grams. In a configuration where the neck 304 is disposed off-axis of the center axis 320 of the liquid delivery container 104, a distance between the center axis 320 of the liquid delivery container 104 and the center axis 322 of the neck 304 is approximately 25 mm to approximately 35 mm. For example, the distance between the center axis 320 of the liquid delivery container 104 and the center axis 322 of the neck 304 may be between approximately 25 mm to approximately 35 mm, approximately 27 mm to approximately 33 mm, approximately 28 mm to approximately 32 mm or approximately 29 mm to approximately 31 mm. Preferably, in any aspect, the distance between the center axis 320 of the liquid delivery container 104 and the center axis 322 of the neck 304 may be approximately 30 mm.

The following dimensions are also presented as examples of the aspects discussed in this disclosure and should not be considered as limiting to such aspects: a length between the housing top portion 200 and the housing bottom portion 202 is between approximately 400 mm to approximately 420 mm. For example, the length between the housing top portion 200 and the housing bottom portion 202 may be between approximately 400 mm to approximately 420 mm, approximately 405 mm to approximately 415 mm, or approximately 408 mm to approximately 412 mm. Preferably, in any aspect, the length between the housing top portion 200 and the housing bottom portion 202 may be between approximately 407 mm to approximately 413 mm. A width of the at least one aperture 212 is approximately 20 mm to approximately 30 mm. For example, the width of the at least one aperture 212 may be between approximately 20 mm to approximately 30 mm, approximately 22 mm to approximately 28 mm, or approximately 23 mm to approximately 27 mm. Preferably, in any aspect, the width of the at least one aperture 212 may be approximately 25 mm. A height of the at least one aperture 212 is between approximately 110 mm to approximately 130 mm. For example, the height of the at least one aperture 212 may be between approximately 110 mm to approximately 130 mm, approximately 115 mm to approximately 125 mm, approximately 117 mm to approximately 123 mm, or approximately 119 mm to approximately 121 mm. Preferably, in any aspect, the height of the at least one aperture 212 may be approximately 124.75 mm. A width of the second handle aperture 220 is between approximately 90 mm to approximately 110 mm. For example, the width of the second handle aperture 220 may be between approximately 90 mm to approximately 110 mm, approximately 92 mm to approximately 108 mm, approximately 95 mm to approximately 105 mm, or approximately 97.5 mm to approximately 102.5 mm. Preferably, in any aspect, the width of the second handle aperture 220 may be approximately 100.2 mm. A height of the second handle aperture 220 is between approximately 40 mm to approximately 50 mm. For example, the height of the second handle aperture 220 may be between approximately 40 mm to approximately 50 mm, approximately 42 mm to approximately 48 mm, approximately 43 mm to approximately 47 mm, or approximately 44 mm to approximately 46 mm. Preferably, in any aspect, the height of the second handle aperture 220 may be between approximately 41 mm to approximately 45 mm. A width of the second surface 218 of the housing body portion 206 is between approximately 220) mm to approximately 250 mm. For example, the width of the second surface 218 of the housing body portion 206 may be between approximately 220 mm to approximately 250 mm, approximately 225 mm to approximately 245 mm, approximately 230 mm to approximately 240 mm, or approximately 232.5 mm to approximately 237.5 mm. Preferably, in any aspect, the width of the second surface 218 of the housing body portion 206 may be between approximately 227 mm to approximately 241 mm. A width of the neck aperture 204 is between approximately 100 mm to approximately 120 mm. For example, the width of the neck aperture 204 may be between approximately 100 mm to approximately 120 mm, approximately 102 mm to approximately 118 mm, approximately 105 mm to approximately 115 mm or approximately 108 mm to approximately 112 mm. Preferably, in any aspect, the width of the neck aperture 204 may be between approximately 104.5 mm and approximately 112.5 mm. A width of the pouring aperture 214 is approximately 105 mm to approximately 115 mm. For example, the width of the pouring aperture 214 may be between approximately 105 mm to approximately 115 mm, approximately 107 mm to approximately 113 mm, approximately 108 mm to approximately 112 mm or approximately 109 mm to approximately 111 mm. Preferably, in any aspect, the width of the pouring aperture 214 may be approximately 111.3 mm. A length of the pouring aperture 214 is approximately 125 mm to approximately 150 mm. For example, the length of the pouring aperture 214 may be between approximately 125 mm to approximately 150 mm, approximately 130 mm to approximately 145 mm, approximately 132 mm to approximately 143 mm, or approximately 135 mm to approximately 140 mm. Preferably, in any aspect, the length of the pouring aperture 214 may be approximately 129.5 mm. The housing top portion 200 includes a wall thickness between approximately 0.3 mm and approximately 0.5 mm. For example, the wall thickness of the housing top portion 200 may be between approximately 0.3 mm to approximately 0.5 mm, approximately 0.32 mm to approximately 0.48 mm, approximately 0.35 mm to approximately 0.45 mm or approximately 0.375 mm to approximately 0.435 mm. The housing body portion 206 includes a wall thickness between approximately 0.2 mm and approximately 0.5 mm. For example, the wall thickness of the housing body portion 206 may be between approximately 0.2 mm to approximately 0.5 mm, approximately 0.25 mm to approximately 0.45 mm, approximately 0.28 mm to approximately 0.42 mm or approximately 0.3 mm to approximately 0.4 mm. The housing bottom portion 202 includes a wall thickness between approximately 0.1 mm and approximately 0.5 mm. For example, the wall thickness of the housing bottom portion 202 may be between approximately 0.1 mm to approximately 0.5 mm, approximately 0.15 mm to approximately 0.45 mm, approximately 0.2 mm to approximately 0.4 mm, or approximately 0.25 mm to approximately 0.35 mm. It should be appreciated that all foregoing ranges of dimensions are provided for illustrative purposes and are not intended to be limiting.

III. OVERVIEW OF EXAMPLE ASSEMBLING METHODS

Figure 21:
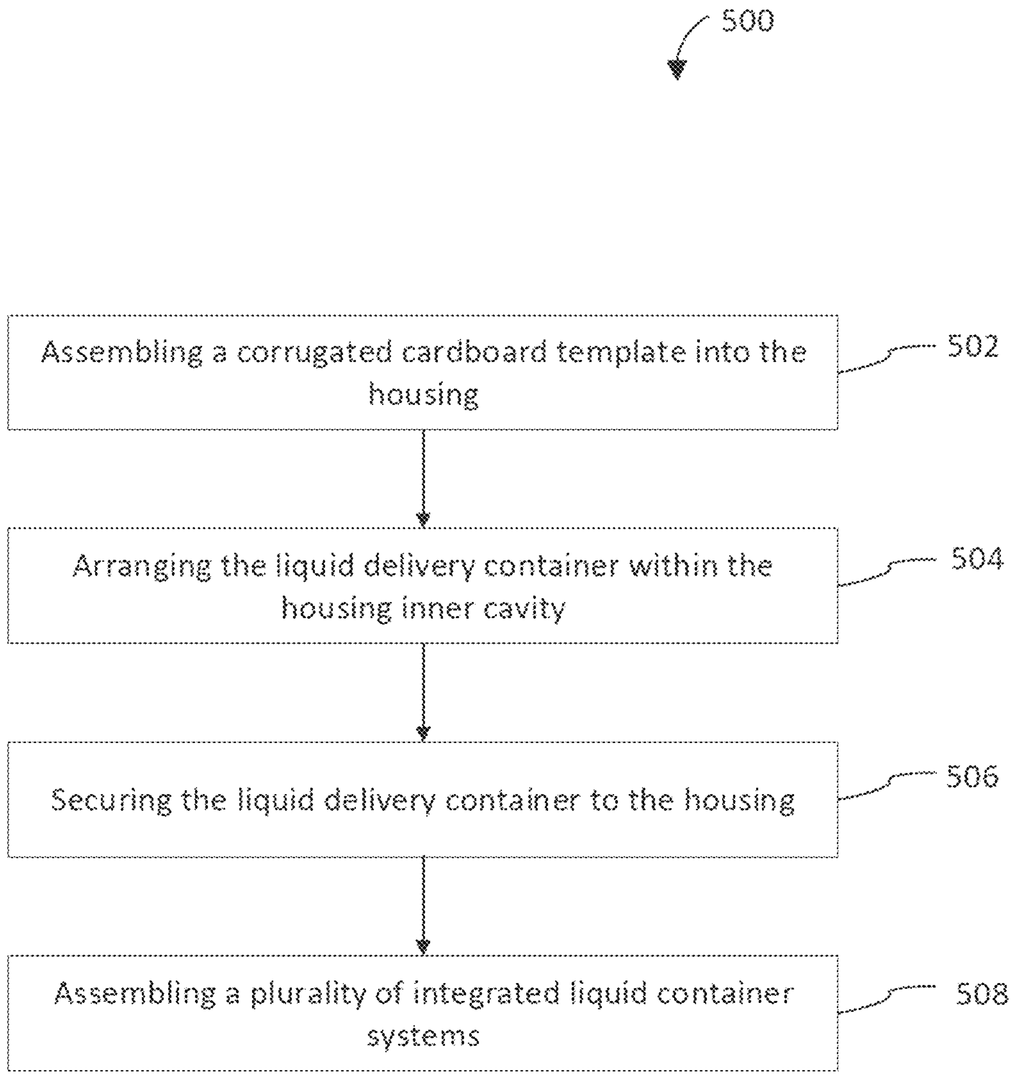
FIG. 21 is a flow diagram of a method for assembling an integrated liquid container system, according to an aspect.
Figure 22:
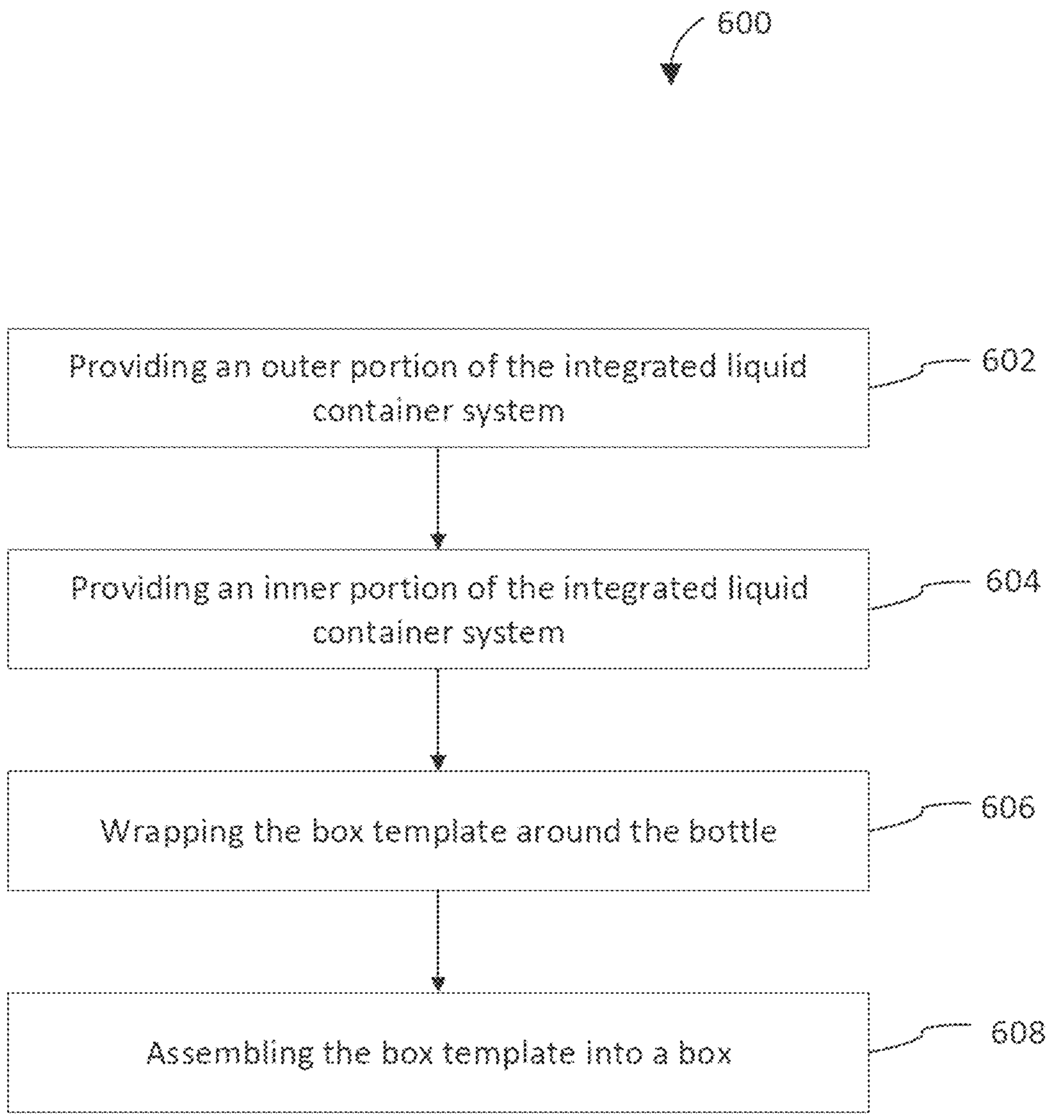
FIG. 22 is a flow diagram of another method for assembling an integrated liquid container system, according to an aspect.

FIGS. 21 and 22 illustrate flow diagrams of various methods of assembling the integrated liquid container system 100. FIG. 21 illustrates a flow diagram of the first method 500 of assembling the integrated liquid container system 100.

At a first step 502 of the first method 500, a corrugated cardboard template is assembled into the housing 102, where the housing 102 is dimensioned to house the liquid delivery container 104.

At a second step 504 of the first method 500, the liquid delivery container 104 is arranged (e.g., received, etc.) within the housing inner cavity 208 such that the neck aperture 204 of the housing top portion 200 circumferentially surrounds at least a portion of the neck 304 of the container top portion 300.

At a third step 506 of the first method 500, the liquid delivery container 104 is secured to the housing 102. In some aspects, the liquid delivery container 104 is secured to the housing 102 via press-fit (e.g., friction hold, etc.) within the housing inner cavity 208 such that inner dimensions of the housing inner cavity 208 equal or approximately equal outer dimensions of the liquid delivery container 104. In other aspects, the liquid delivery container 104 is secured to the housing 102 via protrusions within the housing 102 that press-fit the liquid delivery container 104. In yet other aspects, the liquid delivery container 104 is secured to the housing 102 via adhesive (e.g., glue, tape, etc.). In other aspects, the liquid delivery container 104 is secured to the housing 102 via inverting a portion of the housing 102 that press-fit the liquid delivery container 104. In some examples, as illustrated in FIGS. 5-7 and 25-26, the housing 102 includes tabs 224 that are selectively configured to be inverted so as to contact the container top portion 300, thereby securing and press-fitting the liquid delivery container 104 within the housing 102. In some aspects, the tabs 224 are disposed between the housing top portion 200 and at least one of the first surface 210, the second surface 218, or the third surface 219 of the housing body portion 206. In some examples, the tabs 224 include two tabs 224, where (i) one of the tabs 224 is disposed between the housing top portion 200 and the first surface 210 of the housing body portion 206, and (ii) another one of the tabs 224 is disposed between the housing top portion 200 and the third surface 219 of the housing body portion 206. In some examples, the tabs 224 include an L-shaped cross-section. In other examples, the tabs 224 include a C-shaped, a U-shaped, an H-shaped cross-section or a cross-section having a differing shape.

At a fourth step 508 of the first method 500, a plurality of integrated liquid container systems are assembled together. The plurality of integrated liquid container systems include a first integrated liquid container system and a second integrated liquid container system that are arranged such that the pouring indent 318 of the first integrated liquid container system receives at least a portion of the neck 304 of the second integrated liquid container system.

FIG. 22 illustrates a flow diagram of the second method 600 of assembling the integrated liquid container system 100. At a first step 602 of the second method 600, an outer portion of the integrated liquid container system 100 is provided. The outer portion of the integrated liquid container system 100 includes a box template.

At a second step 604 of the second method 600, an inner portion of the integrated liquid container system 100 is provided. The inner portion of the integrated liquid container system 100 includes a bottle (e.g., liquid delivery container 104).

At a third step 606 of the second method 600, the box template is wrapped around the bottle. At a fourth step 608 of the second method 600, the box template is assembled into a box (e.g., housing 102).

Figure 23:
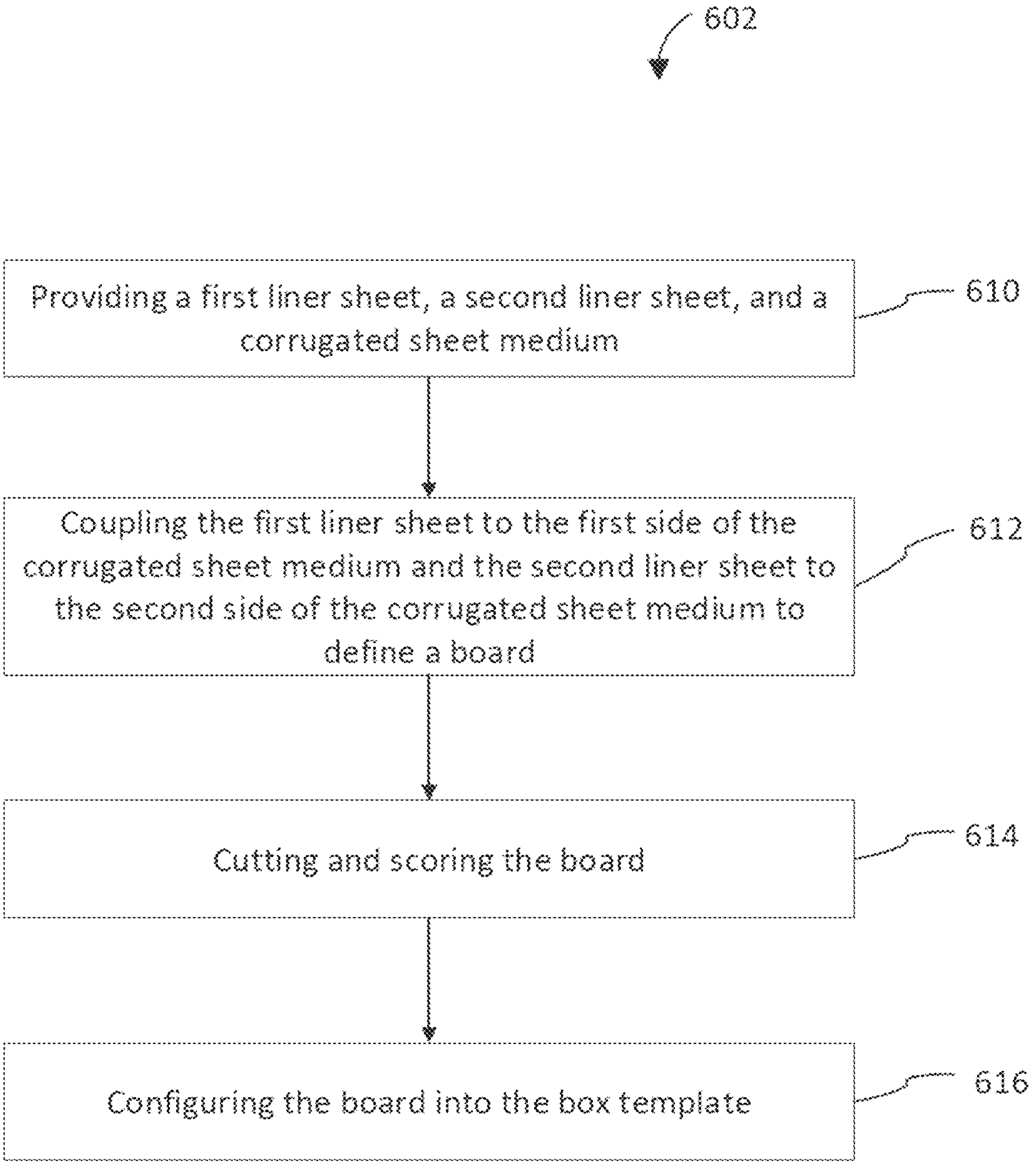
FIG. 23 is a flow diagram of a process of manufacturing the outer portion of the integrated liquid container system of FIG. 22, according to an aspect.

FIG. 23 illustrates a flow diagram detailing the first step 602 of the second method 600, e.g., providing the outer portion of the integrated liquid container system 100. At a first step 610 of providing the outer portion, a first liner sheet (e.g., paper liner, cover, etc.), a second liner sheet, and a corrugated sheet medium (e.g., fluting medium, core, etc.) are provided. The corrugated sheet medium having a first side and a second side. At a second step 612 of providing the outer portion, the first liner sheet is coupled to the first side of the corrugate sheet medium and the second liner sheet is coupled to the second side of the corrugated sheet medium. A combination of the first liner sheet, the second liner sheet, and the corrugated sheet medium defines a board (e.g., corrugated cardboard). At a third step 614 of providing the outer portion, portions of the board are cut and/or scored (e.g., indented, etc.) such that the portions can be easily bent. At a fourth step 616 of providing the outer portion, the board is configured into the box template.

Figure 24:
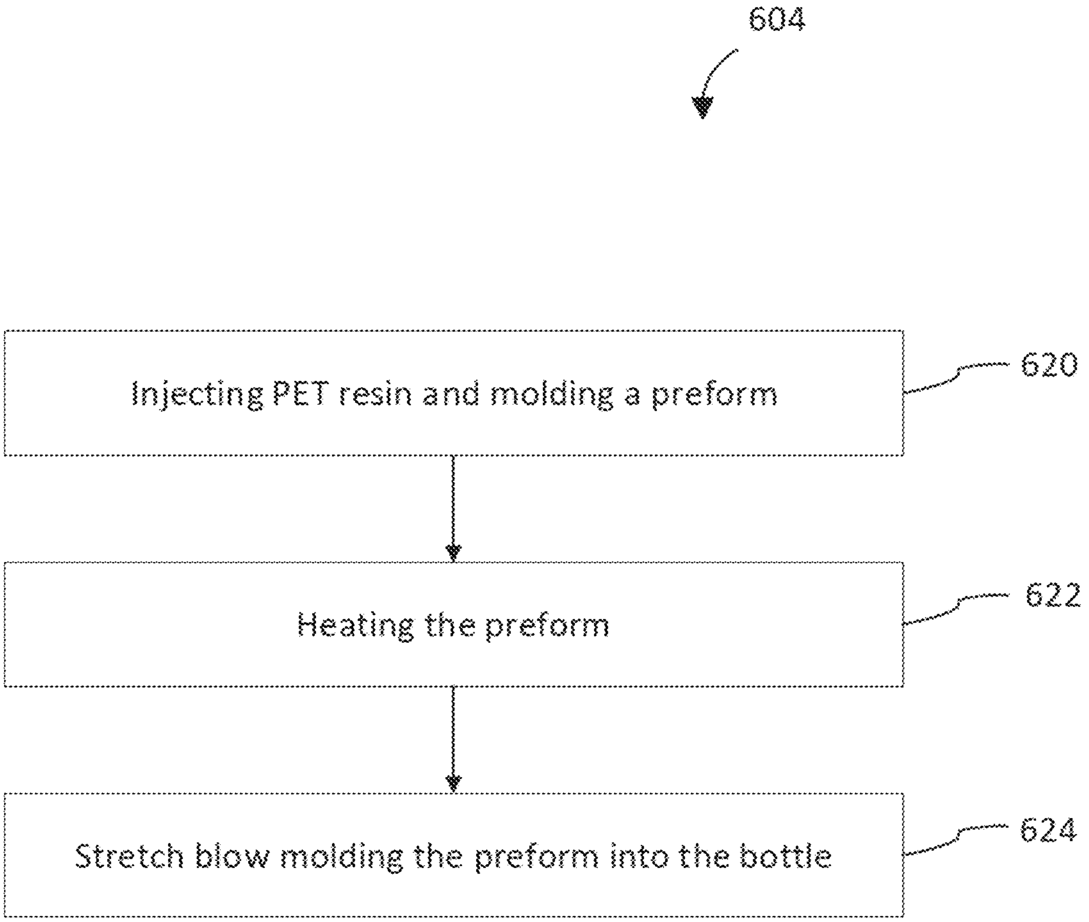
FIG. 24 is a flow diagram of providing the inner portion of the integrated liquid container system of FIG. 22, according to an aspect.
Figure 25:
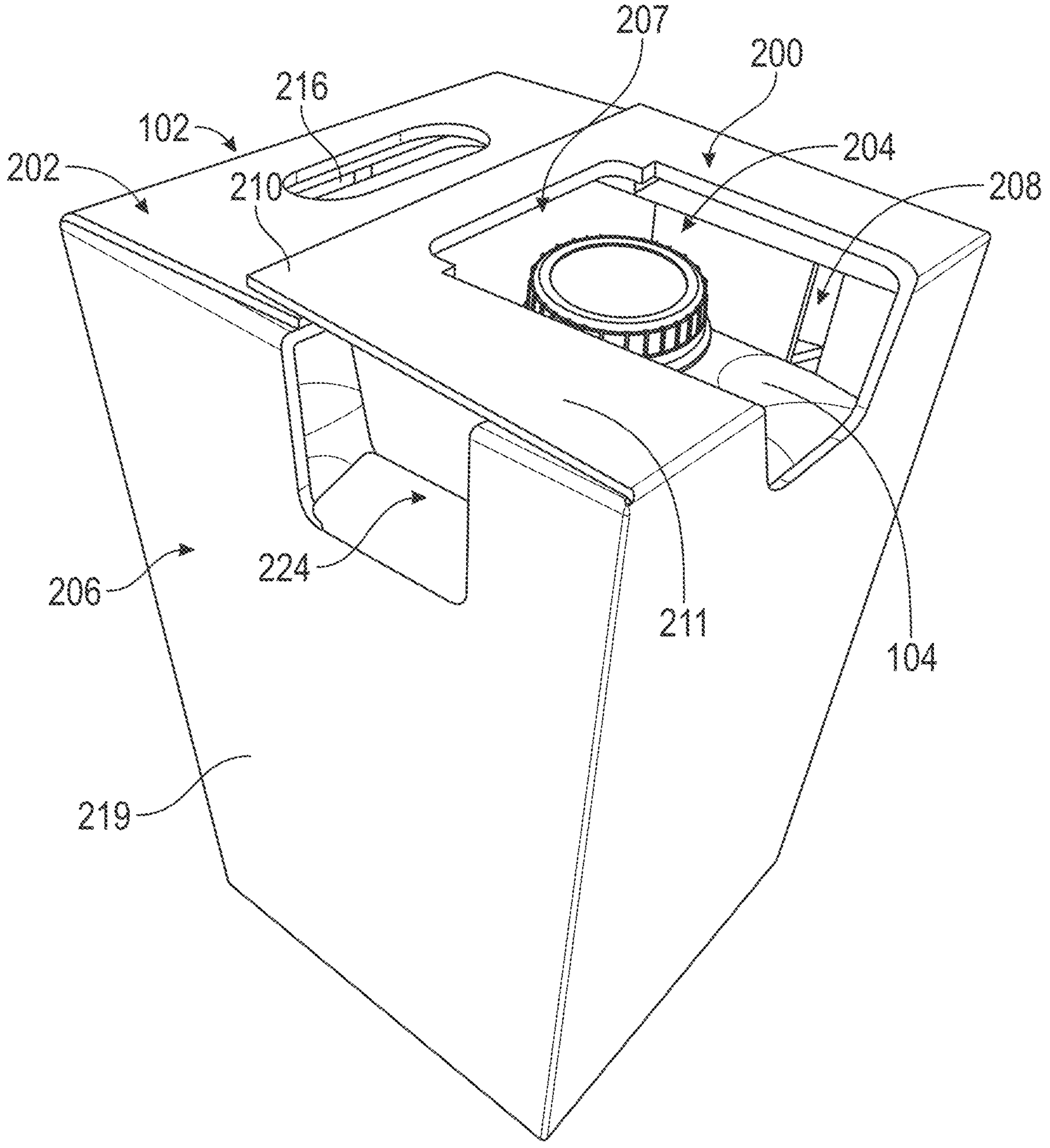
FIG. 25 is a perspective view of an integrated liquid container, according to an aspect.
Figure 26:
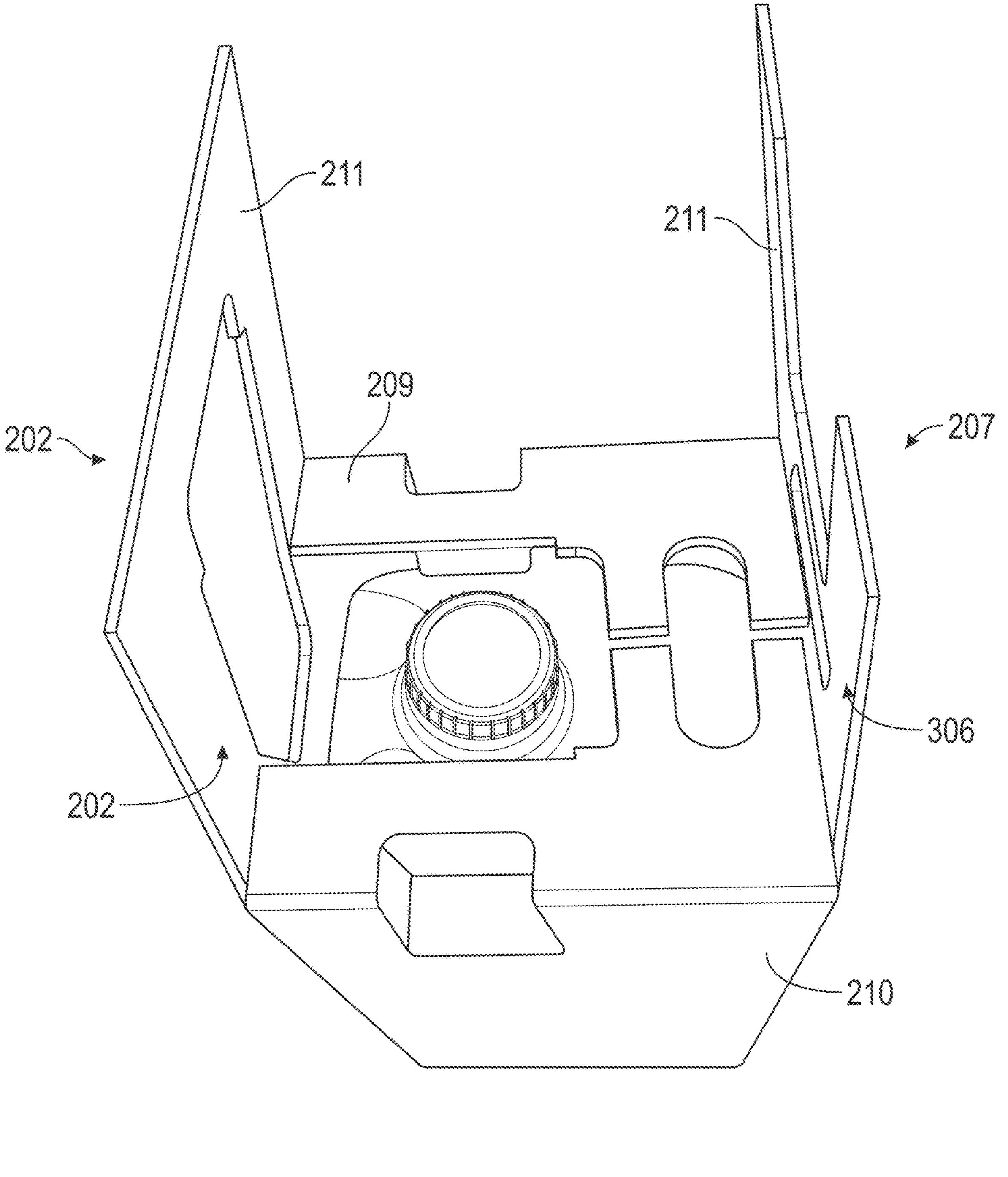
FIG. 26 is another perspective view of the integrated liquid container of FIG. 25, according to an aspect.

FIG. 24 illustrates a flow diagram detailing the second step 604 of the second method 600, e.g., providing the inner portion of the integrated liquid container system 100. At a first step 620 of providing the inner portion, resin of a thermoplastic polymer as described herein (e.g., PET, PLA, PE, PP, PHA, or combinations thereof) is injected into a mold and a preform is molded. In any aspect, the thermoplastic polymer resin is preferably a PET resin. At a second step 622 of providing the inner portion, the preform is heated to a desirable temperature. At a third step 624 of providing the inner portion, the preform is stretch blow molded into the bottle. In contrast, in some aspects, the second step 622 is omitted such that the second method 600 includes only the first step 620 followed by the third step 624. In such aspects, the preform is injected using an apparatus and then later blow molded using the same apparatus.

IV. EXEMPLARY ASPECTS

Aspect 1. An integrated liquid container system including a housing and a liquid delivery container, comprising:

the housing, the housing comprising:

a housing top portion comprising a neck aperture, a housing bottom portion opposite the housing top portion, and a housing body portion extending between the housing top portion and the housing bottom portion and defining a housing inner cavity, wherein the housing body portion comprises a first surface and at least one aperture extending through the first surface of the housing body portion; and the liquid delivery container comprising:

a container top portion comprising a neck, a container bottom portion opposite the container top portion, and a container body portion extending between the container top portion and the container bottom portion to define a container inner cavity configured to store liquid, the liquid delivery container being configured to be received within the container inner cavity such that the neck aperture of the housing top portion circumferentially extends around the neck of the container top portion, and the container top portion, the container bottom portion, and the container body portion each comprising a thermoplastic polymer.

Aspect 2. The integrated liquid container system of Aspect 1, wherein the housing top portion, the housing bottom portion, and the housing body portion comprise corrugated cardboard.

Aspect 3. The integrated liquid container system of Aspect 1 or 2, wherein:

the neck comprises:

a neck top portion comprising a support ring and a threaded portion, and a neck bottom portion comprising a straight portion below the support ring; and the integrated liquid container system further comprises:

a cap that is selectively attachable to and detachable from the neck top portion, wherein (i) when the cap is configured to be attached to the neck top portion by engagement with the threaded portion, the liquid delivery container is in a closed state, and (ii) when the cap is detached from the neck top portion, the liquid delivery container in an open state, and a container handle proximate to the neck bottom portion.

Aspect 4. The integrated liquid container system of any one of Aspects 1-3, wherein:

the housing bottom portion comprises a pouring aperture and the container bottom portion comprises a pouring indent: and the pouring indent at least partially faces the pouring aperture.

Aspect 5. The integrated liquid container system of any one of Aspects 1-4, wherein the housing top portion further comprises a first handle aperture.

Aspect 6. The integrated liquid container system of any one of Aspects 1-5, wherein the housing body portion comprises:

a second surface: and a second handle aperture extending through the second surface of the housing body portion.

Aspect 7. The integrated liquid container system of any one of Aspects 1-6, wherein:

the housing further comprises a housing handle; and the housing handle is coupled to the housing top portion.

Aspect 8. The integrated liquid container system of Aspect 7, wherein the housing handle comprises paperboard or corrugated cardboard.

Aspect 9. The integrated liquid container system of any one of Aspects 1-8, wherein:

the neck is disposed either (i) along a center axis of the liquid delivery container, or (ii) off-axis of the center axis of the liquid delivery container.

Aspect 10. The integrated liquid container system of any one of Aspects 1-9, wherein:

the neck comprises a first surface having a substantially constant circumference such that an outermost portion of the first surface of the neck is equidistant from a center axis of the neck: and the first surface of the neck is structured without protuberances extending circumferentially therefrom.

Aspect 11. The integrated liquid container system of any one of Aspects 1-10, wherein the container top portion comprises:

a first portion parallel to the housing top portion; and a second portion inclined with respect to the first portion of the container top portion, wherein the neck is disposed along the second portion of the container top portion.

Aspect 12. The integrated liquid container system of any one of Aspects 1-11, wherein the at least one aperture is provided proximate to a plurality of indicia indicating a fill level.

Aspect 13. The integrated liquid container system of any one of Aspects 1-12, wherein the thermoplastic polymer has an intrinsic viscosity of about 0.70 dl/g to about 0.90 dl/g.

Aspect 14. The integrated liquid container system of any one of Aspects 1-13, wherein the thermoplastic polymer has an intrinsic viscosity of about 0.72 dl/g to about 0.86 dl/g.

Aspect 15. The integrated liquid container system of any one of Aspects 1-14, wherein the thermoplastic polymer has a melting temperature in a range of about 230° C. to about 270° C.

Aspect 16. The integrated liquid container system of any one of Aspects 1-15, wherein the thermoplastic polymer further comprises a b* value of a CIEL*a*b* color measurement of the thermoplastic polymer of about −3.5 to about 2.5.

Aspect 17. The integrated liquid container system of Aspect 16, wherein the b* value of the CIEL*a*b* color measurement of the thermoplastic polymer is in a range of about −1.5 to about 1.5.

Aspect 18. The integrated liquid container system of any one of Aspects 1-17, wherein the thermoplastic polymer comprises bioplastics, co-polymers, or combinations thereof.

Aspect 19. The integrated liquid container system of any one of Aspects 1-18, wherein the thermoplastic polymer comprises polyethylene terephthalate (PET), poly lactic acid (PLA), polyethylene (PE), polypropylene (PP), polyhydroxyalkanoates (PHA), or mixtures thereof.

Aspect 20. The integrated liquid container system of any one of Aspects 1-18, wherein the thermoplastic polymer is selected from the group consisting of polyethylene terephthalate (PET), poly lactic acid (PLA), polyethylene (PE), polypropylene (PP), polyhydroxyalkanoates (PHA), and combinations thereof.

Aspect 21. The integrated liquid container system of any one of Aspects 1-20, wherein the thermoplastic polymer comprises polyethylene terephthalate (PET).

Aspect 22. A method of assembling an integrated liquid container system including a liquid delivery container within a housing, the method comprising:

assembling a corrugated cardboard template into the housing, the housing being dimensioned to house the liquid delivery container, the housing comprising:

a housing top portion comprising a neck aperture, a housing bottom portion opposite the housing top portion, and a housing body portion extending between the housing top portion and the housing bottom portion to define a housing inner cavity, wherein the housing body portion comprises a first surface and at least one aperture extending through the first surface of the housing body portion;

arranging the liquid delivery container within the housing inner cavity, the liquid delivery container comprising:

a container top portion comprising a neck, a container bottom portion opposite the container top portion and comprising a pouring indent, and a container body portion extending between the container top portion and the container bottom portion to define a container inner cavity, wherein the liquid delivery container top portion, the liquid delivery container bottom portion, and the liquid delivery container body portion comprise a thermoplastic polymer, and wherein arranging the liquid delivery container within the housing inner cavity comprises orienting the liquid delivery container such that the neck aperture of the housing top portion circumferentially surrounds at least a portion of the neck of the container top portion; and securing the liquid delivery container in the housing.

Aspect 23. The method of Aspect 22, further comprising assembling a plurality of integrated liquid container systems together, the plurality of integrated liquid container systems including a first integrated liquid container system and a second integrated liquid container system, wherein assembling the plurality of integrated liquid container systems comprises:

arranging the first integrated liquid container system such that the pouring indent of the first integrated liquid container system receives at least a portion of the neck of the second integrated liquid container system.

Aspect 24. The method of Aspect 22 or 23, wherein the thermoplastic polymer has an intrinsic viscosity of about 0.70 dl/g to about 0.90 dl/g.

Aspect 25. The method of any one of Aspects 22-24, wherein the thermoplastic polymer has a melting temperature in a range of about 230° ° C. to about 270° C.

Aspect 26. The method of any one of Aspects 22-25, wherein the thermoplastic polymer further comprises a b* value of a CIEL*a*b* color measurement of the thermoplastic polymer of about −3.5 to about 2.5.

Aspect 27. The method of any one of Aspects 22-26, wherein the thermoplastic polymer comprises bioplastics, co-polymers, or combinations thereof.

Aspect 28. The method of any one of Aspects 22-27, wherein the thermoplastic polymer comprises polyethylene terephthalate (PET), poly lactic acid (PLA), polyethylene (PE), polypropylene (PP), polyhydroxyalkanoates (PHA), or mixtures thereof.

Aspect 29. The method of any one of Aspects 22-28, wherein the thermoplastic polymer comprises polyethylene terephthalate (PET).

Aspect 30. The method of any one of Aspects 22-29, wherein securing the liquid container in the housing comprises inverting at least one tab disposed between the housing top portion and the housing body portion such that the tab contacts at least a portion of the container top portion.

Aspect 31. A method of assembling an integrated liquid container system, the method comprising:

providing an outer portion of the integrated liquid container system, the outer portion comprising a box template;

providing an inner portion of the integrated liquid container system, the inner portion comprising a bottle, the bottle comprising:

a bottle top portion comprising a neck, a bottle bottom portion opposite the bottle top portion, and a bottle body portion extending between the bottle top portion and the bottle bottom portion to define a bottle inner cavity, wherein the bottle top portion, the bottle bottom portion, and the bottle body portion comprise a thermoplastic polymer comprising polyethylene terephthalate (PET), poly lactic acid (PLA), polyethylene (PE), polypropylene (PP), polyhydroxyalkanoates (PHA), or mixtures thereof;

wrapping the box template around the bottle; and assembling the box template into a box, the box comprising:

a box top portion comprising a neck aperture, a box bottom portion opposite the box top portion, and a box body portion extending between the box top portion and the box bottom portion to define a box inner cavity, the box body portion comprising a first surface and at least one aperture extending through the first surface of the box body portion, wherein each of the box top portion and the box bottom portion comprise a portion comprising double-walled corrugated cardboard.

Aspect 32. The method of Aspect 31, wherein providing the outer portion of the integrated liquid container system comprises:

providing a first liner sheet, a second liner sheet, and a corrugated sheet medium, the corrugated sheet medium comprising a first side and a second side;

coupling the first liner sheet to the first side of the corrugated sheet medium and the second liner sheet to the second side of the corrugated sheet medium, such that combination of the first liner sheet, the second liner sheet, and the corrugated sheet medium defines a board;

cutting and scoring the board; and configuring the board into the box template.

Aspect 33. The method of Aspect 31 or 32, wherein providing the inner portion of the integrated liquid container system comprises:

injecting the thermoplastic polymer resin and molding a preform;

heating the preform; and stretch blow molding the preform into the bottle.

Aspect 34. A bottle comprising:

a bottle top portion comprising a neck, the neck comprising:

a continuous inner surface portion equidistant from a center axis of the neck, and a neck top portion and a neck bottom portion, wherein the neck is positioned at an axial center of the liquid delivery container;

a bottle bottom portion opposite the bottle top portion, the bottle bottom portion comprising a pouring indent, wherein the pouring indent is a substantially curvilinear recess formed in an underside of the bottle bottom portion;

a bottle body portion extending between the bottle top portion and the bottle bottom portion to define a bottle inner cavity, wherein the bottle top portion, the bottle bottom portion, and the bottle body portion consist of a thermoplastic polymer selected from the group consisting of polyethylene terephthalate (PET), poly lactic acid (PLA), polyethylene (PE), polypropylene (PP), polyhydroxyalkanoates (PHA), and combinations thereof;

a cap that is selectively attachable to and detachable from the neck top portion, wherein (i) when the cap is attached to the neck top portion, the bottle is in a closed state, and (ii) when the cap is detached from the neck top portion, the bottle in an open state; and a plastic bottle handle having a first portion proximate the cap.

Aspect 35. The bottle of Aspect 34, wherein the bottle handle extends from an uppermost surface of the bottle to a recess in a side surface of the bottle, such that at least a second portion of the bottle handle is configured to be stowed in the recess.

Aspect 36. The bottle of Aspect 34 or 35, wherein:

the bottle top portion includes a wall thickness between approximately 0.2 mm and approximately 0.5 mm;

the bottle body portion includes a wall thickness between approximately 0.15 mm and approximately 0.5 mm; and the bottle bottom portion includes a wall thickness between approximately 0.15 mm and approximately 0.5 mm.

Aspect 37. The bottle of any one of Aspects 34-36, wherein, when the cap is attached to the neck top portion, the cap and the neck top portion create a plug-seal.

IV. CONFIGURATION OF EXAMPLE ASPECTS

Various numerical values herein are provided for reference purposes only. Unless otherwise indicated, all numbers expressing quantities of properties, parameters, conditions, and so forth, used in the specification and claims are to be understood as being modified in all instances by the term "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "approximately" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

It should be noted that the term "example" as used herein to describe various aspects is intended to indicate that such aspects are possible examples, representations, and/or illustrations of possible aspects (and such term is not intended to connote that such aspects are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

The terms "coupled." "connected." and the like as used herein mean the joining of two members directly or indirectly to one another. Coupling may be electrical, mechanical and/or fluidic. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary aspects are illustrative only. Although only a few aspects have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary aspects without departing from the scope of the aspects described herein.

Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain aspects require at least one of X, at least one of Y, and at least one of Z to each be present, unless otherwise indicated.

What is claimed is:

1. An integrated liquid container system including a housing and a liquid delivery container, comprising:

the housing, the housing comprising:

a housing top portion comprising a neck aperture, a housing bottom portion opposite the housing top portion, wherein the housing bottom portion comprises a pouring aperture configured to allow a user to grip the integrated container system, and a housing body portion extending between the housing top portion and the housing bottom portion and defining a housing inner cavity, wherein the housing body portion comprises a first surface and at least one aperture extending through the first surface of the housing body portion, and the housing top portion and the housing body portion defines a tab extending into the housing inner cavity; and the liquid delivery container comprising:

a container top portion comprising a neck having a length, a container bottom portion opposite the container top portion, and a container body portion extending between the container top portion and the container bottom portion to define a container inner cavity configured to store liquid, the liquid delivery container being configured to be received within the housing inner cavity such that the neck aperture of the housing top portion circumferentially extends around the neck of the container top portion, and the container top portion, the container bottom portion, and the container body portion each comprising a thermoplastic polymer excluding high density polyethylene, wherein the tab is configured to contact the container.

2. The integrated liquid container system of claim 1, wherein the housing top portion, the housing bottom portion, and the housing body portion comprise corrugated cardboard.

3. The integrated liquid container system of claim 1, wherein:

the neck comprises:

a neck top portion comprising a support ring and a threaded portion, and a neck bottom portion comprising a straight portion below the support ring; and the integrated liquid container system further comprises:

a cap that is selectively attachable to and detachable from the neck top portion, wherein (i) when the cap is configured to be attached to the neck top portion by engagement with the threaded portion, the liquid delivery container is in a closed state, and (ii) when the cap is detached from the neck top portion, the liquid delivery container in an open state, and a container handle proximate to the neck bottom portion.

4. The integrated liquid container system of claim 1, wherein:

the container bottom portion comprises a pouring indent, wherein the pouring indent does not extend through the container bottom portion, and the pouring indent at least partially faces the pouring aperture.

5. The integrated liquid container system of claim 1, wherein the housing top portion further comprises a first handle aperture.

6. The integrated liquid container system of claim 1, wherein the housing body portion comprises:

a second surface; and a second handle aperture extending through the second surface of the housing body portion.

7. The integrated liquid container system of claim 1, wherein:

the neck comprises a first surface having a substantially constant circumference such that an outermost portion of the first surface of the neck is equidistant from a center axis of the neck; and the first surface of the neck is structured without protuberances extending circumferentially therefrom.

8. The integrated liquid container system of claim 1, wherein the container top portion comprises:

a first portion parallel to the housing top portion; and a second portion inclined with respect to the first portion of the container top portion, wherein the neck is disposed along the second portion of the container top portion.

9. The integrated liquid container system of claim 1, wherein the at least one aperture is provided proximate to a plurality of indicia indicating a fill level.

10. The integrated liquid container system of claim 1, wherein the thermoplastic polymer has an intrinsic viscosity of about 0.70 dl/g to about 0.90 dl/g.

11. The integrated liquid container system of claim 1, wherein the thermoplastic polymer has a melting temperature in a range of about 230° C. to about 270° C.

12. The integrated liquid container system of claim 1, wherein the thermoplastic polymer further comprises a b* value of a CIEL*a*b* color measurement of the thermoplastic polymer of about −3.5 to about 2.5.

13. The integrated liquid container system of claim 1, wherein the thermoplastic polymer comprises bioplastics, co-polymers, or combinations thereof.

14. The integrated liquid container system of claim 1, wherein the thermoplastic polymer is selected from the group consisting of polyethylene terephthalate (PET), poly lactic acid (PLA), polyethylene (PE), polypropylene (PP), polyhydroxyalkanoates (PHA), and combinations thereof.

15. The integrated liquid container system of claim 1, wherein the thermoplastic polymer comprises polyethylene terephthalate (PET).

16. A method of assembling an integrated liquid container system including a liquid delivery container within a housing, the method comprising:

assembling a corrugated cardboard template into the housing, the housing being dimensioned to house the liquid delivery container, the housing comprising:

a housing top portion comprising a neck aperture, a housing bottom portion opposite the housing top portion, wherein the housing bottom portion comprises a pouring aperture configured to allow a user to grip the integrated container system, and a housing body portion extending between the housing top portion and the housing bottom portion to define a housing inner cavity, wherein the housing body portion comprises a first surface and at least one aperture extending through the first surface of the housing body portion, and the housing top portion and the housing body portion defines a tab;

arranging the liquid delivery container within the housing inner cavity, the liquid delivery container comprising:

a container top portion comprising a neck having a length, a container bottom portion opposite the container top portion and comprising a pouring indent, and a container body portion extending between the container top portion and the container bottom portion to define a container inner cavity configured to store liquid, wherein the liquid delivery container top portion, the liquid delivery container bottom portion, and the liquid delivery container body portion comprise a thermoplastic polymer excluding high density polyethylene, and wherein the housing bottom portion comprises a pouring aperture, wherein arranging the liquid delivery container within the housing inner cavity comprises orienting the liquid delivery container such that the neck aperture of the housing top portion circumferentially extends around the neck of the container top portion; and securing the liquid delivery container in the housing by inverting the tab such that it extends into the housing inner cavity and contacts the container.

17. The method of claim 16, further comprising assembling a plurality of integrated liquid container systems together, the plurality of integrated liquid container systems including a first integrated liquid container system and a second integrated liquid container system, wherein assembling the plurality of integrated liquid container systems comprises:

arranging the first integrated liquid container system such that the pouring indent of the first integrated liquid container system receives at least a portion of the neck of the second integrated liquid container system.

18. The method of claim 16, wherein the thermoplastic polymer has an intrinsic viscosity of about 0.70 dl/g to about 0.90 dl/g.

19. The method of claim 16, wherein the thermoplastic polymer has a melting temperature in a range of about 230° C. to about 270° C.

20. The method of claim 16, wherein the thermoplastic polymer further comprises a b* value of a CIEL*a*b* color measurement of the thermoplastic polymer of about −3.5 to about 2.5.

21. The method of claim 16, wherein the thermoplastic polymer comprises bioplastics, co-polymers, or combinations thereof.

22. The method of claim 16, wherein the thermoplastic polymer comprises polyethylene terephthalate (PET), poly lactic acid (PLA), polyethylene (PE), polypropylene (PP), polyhydroxyalkanoates (PHA), or mixtures thereof.

23. A method of assembling an integrated liquid container system, the method comprising:

providing an outer portion of the integrated liquid container system, the outer portion comprising a box template;

providing an inner portion of the integrated liquid container system, the inner portion comprising a bottle, the bottle comprising:

a bottle top portion comprising a neck having a length, a bottle bottom portion opposite the bottle top portion, and a bottle body portion extending between the bottle top portion and the bottle bottom portion to define a bottle inner cavity configured to store liquid, wherein the bottle top portion, the bottle bottom portion, and the bottle body portion comprise a thermoplastic polymer comprising polyethylene terephthalate (PET), poly lactic acid (PLA), polyethylene (PE), polypropylene (PP), polyhydroxyalkanoates (PHA), or mixtures thereof;

wrapping the box template around the bottle;

assembling the box template into a box, the box comprising:

a box top portion comprising a neck aperture, a box bottom portion opposite the box top portion, and a box body portion extending between the box top portion and the box bottom portion to define a box inner cavity, the box body portion comprising a first surface and at least one aperture extending through the first surface of the box body portion, wherein each of the box top portion and the box bottom portion comprise a portion comprising double-walled corrugated cardboard, wherein the bottle is configured to be received within the box inner cavity such that the neck aperture of the box top portion circumferentially extends around the neck of the bottle top portion, and the bottle top portion, the bottle bottom portion, and the bottle body portion each comprising a thermoplastic polymer excluding high density polyethylene, and wherein the box bottom portion comprises a pouring aperture configured to allow a user to grip the integrated container system; and securing the liquid delivery container in the housing by inverting a tab defined by the box top portion and the box body portion such that the tab extends into the housing inner cavity and contacts the bottle.

24. The method of claim 23, wherein providing the outer portion of the integrated liquid container system comprises:

providing a first liner sheet, a second liner sheet, and a corrugated sheet medium, the corrugated sheet medium comprising a first side and a second side;

coupling the first liner sheet to the first side of the corrugated sheet medium and the second liner sheet to the second side of the corrugated sheet medium, such that combination of the first liner sheet, the second liner sheet, and the corrugated sheet medium defines a board;

cutting and scoring the board; and configuring the board into the box template.

25. The method of claim 23, wherein providing the inner portion of the integrated liquid container system comprises:

injecting the thermoplastic polymer resin and molding a preform;

heating the preform; and stretch blow molding the preform into the bottle.

* * * * *